US012705877B2

(12) United States Patent
Lu et al.

(10) Patent No.: US 12,705,877 B2
(45) Date of Patent: Aug. 11, 2026

(54) PARALLELIZED ARCHITECTURE FOR MULTI-DIMENSIONAL DATA PROCESSORS

(71) Applicant: NVIDIA Corporation, Santa Clara, CA (US)

(72) Inventors: Yi Lu, Shanghai (CN); Ching-Yu Hung, Pleasanton, CA (US); Hanjie Mei, Shanghai (CN); Yen-Te Shih, Zhubei City (TW); Chao Lyu, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 155 days.

(21) Appl. No.: 18/818,107

(22) Filed: Aug. 28, 2024

(65) Prior Publication Data

US 2026/0051013 A1 Feb. 19, 2026

(30) Foreign Application Priority Data

Aug. 15, 2024 (CN) ........................ 202411122864.0

(51) Int. Cl.
*G06V 10/94* (2022.01)
*G06T 1/20* (2006.01)
*G06V 10/44* (2022.01)

(52) U.S. Cl.
CPC ................ *G06V 10/94* (2022.01); *G06T 1/20* (2013.01); *G06V 10/44* (2022.01)

(58) Field of Classification Search
CPC ........ G06V 10/94; G06V 10/44; G06V 10/50; G06V 10/955; G06T 1/20
See application file for complete search history.

(56) References Cited

U.S. PATENT DOCUMENTS

| | | | |
|---|---|---|---|
| 5,430,885 | A | 7/1995 | Kaneko et al. |
| 8,856,493 | B2 | 10/2014 | Beaumont |
| 11,954,496 | B2 | 4/2024 | Hung et al. |
| 12,118,353 | B2 | 10/2024 | Hung et al. |
| 12,204,475 | B2 | 1/2025 | Itani et al. |
| 2015/0023602 | A1 | 1/2015 | Wnuk et al. |
| 2015/0221133 | A1 | 8/2015 | Groten et al. |
| 2019/0362155 | A1 | 11/2019 | Croxford |
| 2019/0362518 | A1 | 11/2019 | Croxford et al. |
| 2020/0250807 | A1 | 8/2020 | Hong et al. |
| 2022/0156943 | A1 | 5/2022 | Zhang et al. |
| 2023/0037738 | A1 | 2/2023 | Itani et al. |
| 2023/0042858 | A1 | 2/2023 | Singh et al. |
| 2023/0053042 | A1 | 2/2023 | Hung et al. |
| 2023/0124604 | A1 | 4/2023 | Hung et al. |
| 2023/0153266 | A1 | 5/2023 | Hung et al. |
| 2023/0185569 | A1 | 6/2023 | Itani et al. |
| 2024/0045722 | A1 | 2/2024 | Singh et al. |
| 2024/0311951 | A1 | 9/2024 | Panneer et al. |
| 2024/0346811 | A1 | 10/2024 | Cui et al. |
| 2025/0130705 | A1 | 4/2025 | Kimhi et al. |

*Primary Examiner* — Tammy Paige Goddard
(74) *Attorney, Agent, or Firm* — Foley & Lardner LLP

(57) ABSTRACT

Aspects of this technical solution can increase speed of processing in low-latency application areas, while maintaining integrity of image feature recognition at those higher speeds. For example, in image-processing environments associated with autonomous navigation (e.g., driving), a large volume of image data is to be rapidly and accurately processed to maintain reliable and up-to-date models of a physical environment. For example, embodiments in accordance with this disclosure can provide high-speed and accurate image feature recognition of input frame data beyond the capability of CPU processing or general GPU processing to achieve.

20 Claims, 21 Drawing Sheets

200

400D

400E

SERVER(S) 978

CPU 980(A)

CPU 980(B)

PCIe SWITCH 982(A)

PCIe SWITCH 982(B)

PCIe SWITCH 982(C)

PCIe SWITCH 982(D)

GPU 984(A)

GPU 984(B)

GPU 984(C)

GPU 984(D)

GPU 984(E)

GPU 984(F)

GPU 984(G)

GPU 984(H)

986

988

NETWORK(S) 990

992

994

900

PARALLELIZED ARCHITECTURE FOR MULTI-DIMENSIONAL DATA PROCESSORS

CROSS-REFERENCE TO RELATED APPLICATIONS

This application claims priority to Chinese Patent Application No. 202411122864.0 filed on Aug. 15, 2024, the contents of which are hereby incorporated by reference in their entirety.

TECHNICAL FIELD

The present implementations relate generally to microprocessor devices, including but not limited to an architecture and instruction set for multi-dimensional data processing, architecture for reuse of frame data across multi-dimensional data processors, and parallelized architecture for multi-dimensional data processors.

INTRODUCTION

Computational processors are increasingly expected to handle increasingly complex datasets at increasing speed. However, conventional processing systems can have significant differences in processing speed or data transfer speed, resulting in mismatches between processing components that can reduce overall system performance and reduce or eliminate ability to conduct various types of computational processes outright (e.g., image processing or graphics processing).

SUMMARY

Aspects of this technical solution can increase speed of processing in low-latency application areas, while maintaining integrity of image feature recognition at those higher speeds. For example, in image-processing environments associated with autonomous or semi-autonomous navigation (e.g., driving, robotics control, etc.), a large volume of image data is to be rapidly and accurately processed to maintain reliable and up-to-date models of a physical environment. For example, embodiments in accordance with this disclosure can provide high-speed and accurate image feature recognition of input frame data beyond the capability of CPU processing or general GPU processing to achieve. Thus, a technical solution for parallelized architecture for multi-dimensional data processing is provided.

At least one aspect is directed to a system. The system can include a plurality of processors. The system can determine that first frame data corresponds to a first time and that second frame data corresponds to a second time subsequent to the first time. The system can provide the first frame data to a first processor of the plurality of processors configured to execute input arranged in two dimensions. The system can provide, in parallel with the providing the first frame data to the first processor, the second frame data to a second processor of the plurality of processors configured to execute input arranged in one dimension. The system can execute the first processor according to the first frame data in parallel with executing the second processor according to the second frame data.

At least one aspect is directed to a system-on-chip (SoC). The SoC can include at least one graphics processing unit (GPU) and a plurality of processors. The SoC can determine that first frame data corresponds to a first time and that second frame data corresponds to a second time subsequent to the first time. The SoC can provide the first frame data to a first processor of the plurality of processors configured to execute input arranged in two dimensions. The SoC can provide, in parallel with the providing the first frame data to the first processor, the second frame data to a second processor of the plurality of processors configured to execute input arranged in one dimension. The SoC can execute the first processor according to the first frame data in parallel with executing the second processor according to the second frame data.

At least one aspect is directed to a method performed by a plurality of processors. The method can include determining that first frame data corresponds to a first time and that second frame data corresponds to a second time subsequent to the first time. The method can include providing the first frame data to a first processor of the plurality of processors configured to execute input arranged in two dimensions. The method can include providing, in parallel with the providing the first frame data to the first processor, the second frame data to a second processor of the plurality of processors configured to execute input arranged in one dimension. The method can include executing the first processor according to the first frame data in parallel with executing the second processor according to the second frame data.

BRIEF DESCRIPTION OF THE FIGURES

These and other aspects and features of the present implementations are depicted by way of example in the figures discussed herein. Present implementations can be directed to, but are not limited to, examples depicted in the figures discussed herein. Thus, this disclosure is not limited to any figure or portion thereof depicted or referenced herein, or any aspect described herein with respect to any figures depicted or referenced herein.

DETAILED DESCRIPTION

Figure 1:
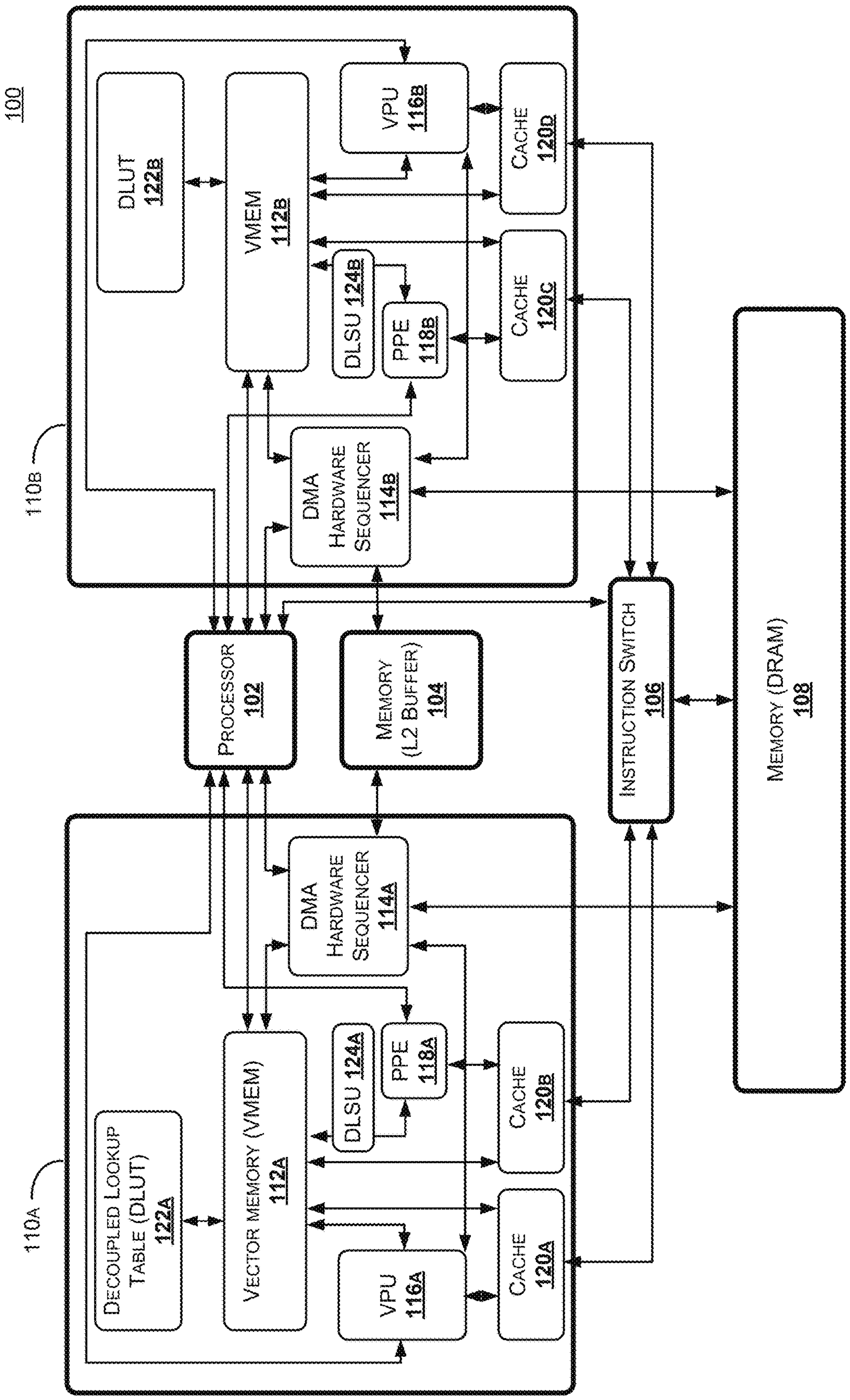
FIG. 1 depicts an example computing environment in which one or more devices operate to process data using a system-on-a-chip (SoC), in accordance with some embodiments of the present disclosure.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

The present disclosure is directed at least to increasing computational efficiency of determination of image features in frame data, by loading data fewer times and multidimensionally shifting loaded data across multiple dimensions (e.g., rows and columns of image data) to reduce processing delays and computational processing by redundant data loading operations. This technical solution can thus significantly increase speed, and thus responsiveness in low-latency environments, of image processing beyond the capability of manual processes to achieve. Specifically, this technical solution can obtain multidimensional frame data (e.g., a 2×2 block of image data), and can provide portions of that frame data to a plurality of pixel processing engines (PPEs). Each PPE can process the frame data in multiple dimensions, to provide a technical improvement to increase speed of image processing beyond the capability of generic or conventional processors. For example, a pixel processing engine (PPE) can process input data according to a two-dimensional (e.g., N×N) data structure including a plurality of rows and a plurality of columns. A system according to this disclosure can execute various feature recognition operations (e.g., Harris corner and non-maximum suppression) via one or more PPEs that can provide accelerated N×N data execution on frame data. Thus, this technical solution can achieve a technical improvement at least to accelerate hardware-level image feature recognition across multiple PPE processors as discussed herein, but is not limited thereto.

The present disclosure is directed at least to reduction computation for image feature recognition by reusing portions of image data across multiple feature recognition operations. In an aspect, a system can include one or more processors and a memory device (e.g., L2 cache), where portions of frame data can be temporarily stored at the memory device and provided to and from the one or more processors via the memory device. For example, a processor can correspond to a PPE can process input data according to a two-dimensional (e.g., N×N) data structure including a plurality of rows and a plurality of columns. The PPE can perform various feature recognition operations across rows and columns, including, for example a Harris corner operation on an N×N block. The PPE can store a portion of the processed block (e.g., 1×N row) to the memory device, where the portion corresponds to a halo of a first frame. The PPE (or another PPE of the system) can execute a second feature recognition operation (e.g., non-maximum suppression) on a second frame data (e.g., for a distinct portion of image data) having a different frame data size (e.g., (N−1)×N) and can combine the output of the second feature recognition operation with the portion of the processed block to create an output of the second feature recognition operation of a full block size (N×N) via an operation on less than the full block size (e.g., (N−1)×N). Thus, this technical solution can achieve a technical improvement at least to accelerate hardware-level image feature recognition by reuse of data generated by various feature recognition operations as discussed herein, but is not limited thereto.

The present disclosure is directed at least to providing parallelized execution across multiple processor types to maximize utilization of each of the multiple processors, including parallelization of image feature processing and image feature preprocessing and loading operations. A processor can include a plurality of processing components (e.g., processor cores or allocated portions thereof) that can each execute various features recognition operations according to various data structures. For example, a vector processing unit (VPU) can process input data according to a one-dimensional (e.g., 1×N) data structure including a single row. For example, a PPE can process input data according to a two-dimensional (e.g., N×N) data structure including a plurality of rows and a plurality of columns. A system according to this disclosure can parallelize execution of various feature recognition operations (e.g., Harris corner and non-maximum suppression) on a PPE that can be accelerated by N×N data execution, with execution of various image processing operations (e.g., masking, packing, and halo preparation) on a VPU performing 1×N data execution. Thus, this technical solution can achieve a technical improvement at least to accelerate hardware-level image feature recognition by parallel processing across PPE and VPU processors as discussed herein, but is not limited thereto.

In an aspect, feature detection in image data or video data can include calculating features according to one or more image processing operations (e.g., Harris corner, SIFT, SURF). For example, a programmable one-dimensional (1D) single-instruction multiple-data (SIMD) processor (e.g., a VPU). For example, a VPU can include multiple SIMD lanes that can support vector memory operations and vector math operations which are suitable for computing intensive applications. For example, vision processing in autonomous or semi-autonomous driving or robotics control requires higher resolution and more cameras for processing, which leads to a significant increase in computing workload. As a result, a feature detection processing running exclusively on VPU devices can consume up to 80% of execution time. Thus, this technical solution is directed at least to including a PPE device to accelerate execution in coordinated execution of feature processing operations with one or more PPE devices. Though discussed by way of example herein with respect to Harris corner image recognition, this disclosure is not limited to Harris corner operations.

With reference to FIG. 1, the environment 100 can include processor 102, memory 104, instruction switch 106, memory 108 (sometimes referred to as dynamic random-access memory or DRAM), and functional blocks 110*a*, 110*b* (referred to individually as functional block 110 and collectively as functional blocks 110 unless otherwise specified). In some embodiments, the processor 102, memory 104, instruction switch 106, memory 108, and functional blocks 110 can interconnect (e.g., establish a connection to communicate and/or the like) via wired and/or wireless connections. In some embodiments, the components of the environment 100 can be included in a system on a chip (SoC). For example, the components of the environment 100 can be included in one or more SoCs that form integrated circuits by combining some or all of the component of the environment 100. The environment 100 can be included as or can be used to implement any functional blocks in FIGS. 9A-11.

The processor 102 can include one or more processors such as one or more central processing units (CPUs), graphical processing units (GPUs), microprocessors, microcontrollers, and/or the like. The processor 102 can interconnect with an instruction cache (not explicitly shown) that stores instructions for the processor 102 to execute. In some embodiments, the processor 102 can be configured to output data associated with configuration and/or control of one or more of the devices of FIG. 1. For example, the processor 102 can be configured to output data associated with configuration of a direct memory access (DMA) hardware sequencer 114*a* and/or DMA hardware sequencer 114*b* to control DMA transfers to and/or from vector memory (VMEM) 112*a* and/or VMEM 112*b* of functional block 110*a* and functional block 110*b*, respectively.

The memory 104 (sometimes referred to as an L2 buffer or L2 cache) can include a storage device that is interconnected with the DMA hardware sequencer 114*a* and/or the DMA hardware sequencer 114*b* of the functional blocks 110. In some embodiments, the memory 104 can be configured to receive and store data from the DMA hardware sequencer 114*a* and/or the DMA hardware sequencer 114*b* of the functional blocks 110 as described herein. In some embodiments, the memory 104 can have one or more (e.g., 2) banks that enable simultaneous read or write requests. For example, the memory 104 can have a first bank that is associated with the DMA hardware sequencer 114*a* and a second bank that is associated with the DMA hardware sequencer 114*b*.

The instruction switch 106 can include one or more processors that are configured to scan the memory 108, receive data from the memory 108, cause data stored in the memory 108 and/or in local memory to the instruction switch 106 to be loaded into the VMEM 112, and/or the like. For example, the instruction switch 106 can be coupled to the memory 108 and/or include internal memory that has stored thereon instructions involved in operating one or more of the devices of the corresponding functional blocks 110. In an example, the instruction switch 106 can be configured to obtain and provide data associated with instructions to perform one or more DMA transfers as described herein. In another example, the instruction switch 106 can be configured to obtain and provide data associated with instructions to perform one or more operations specific to one or more devices of the functional blocks 110. In an illustrative example, the instruction switch 106 can be configured to obtain and provide data associated with instructions to perform one or more filtering operations and the instruction switch 106 can transmit the data to caches 120 of corresponding functional units 110. In this illustrative example, the corresponding caches 120 can be configured to transmit (e.g., load) the data associated with the instructions into the VPU 116 or PPE 118 to cause the respective device to perform the one or more filtering operations.

The memory 108 can include a storage device that is interconnected with the DMA hardware sequencer 114*a* and/or the DMA hardware sequencer 114*b* of the functional blocks 110. In some embodiments, the memory 108 can receive and store sensor data generated by one or more sensors of a robot such as, for example, the example autonomous vehicle of FIGS. 10A-10D. For example, during operation of the robot, the memory 108 can be configured to receive data based at least in part on a direct interconnection with the one or more sensors or an indirect interconnection with the one or more sensors (e.g., via communication through a CAN bus and/or the like). In these examples, the sensor data can include image data associated with one or more images generated by one or more cameras, LiDAR data associated with one or more LiDAR data associated with one or more point clouds generated by one or more LiDAR sensors, radar data associated with one or more radar images generated by one or more radar sensors, and/or the like. In some embodiments, the memory 108 can be configured to provide (e.g., transmit) the sensor data stored therein to one or more components of the functional blocks 110. For example, during processing of the one or more image generated by the one or more cameras of the robot, the DMA hardware sequencer 114*a* and/or DMA hardware sequencer 114*b* can obtain the image data from the memory 108 and cause the image data to be stored in the VMEM 112*a* and/or VMEM 112*b*, respectively. In some embodiments, the memory 108 can receive and store data from the DMA hardware sequencer 114*a* and/or the DMA hardware sequencer 114*b* of the functional blocks 110. For example, the DMA hardware sequencer 114*a* and/or DMA hardware sequencer 114*b* can provide image data that was updated based at least in part on the processing of the image data to the memory 108 and the memory 108 can store the image data that was updated in the memory 108.

Functional blocks 110 can include VMEMs 112*a*, 112*b*, DMA hardware sequencers 114*a*, 114*b*, vector processing units (VPUs) 116*a*, 116*b*, pixel processing engines (PPE) 118*a*, 118*b*, caches 120*a*, 120*b*, 120*c*, 120*d*, and decoupled lookup tables (DLUTs) 122*a*, 122*b*. For purposes of clarity, each will be referred to individually as VMEM 112, DMA hardware sequencer 114, VPU 116, PPE 118, cache 120, and DLUT 122, and collectively as VMEMs 112, DMA hardware sequencers 114, VPUs 116, PPEs 118, caches 120, and DLUTs 122 unless otherwise specified. While certain interconnections are illustrated, it will be understood that the connections illustrated are for simplicity and that one or more of the devices of the functional blocks 110 can interconnect with one or more other devices of the functional blocks 110 unless expressly stated otherwise.

The VMEMs 112 can include a storage device that is interconnected with the processor 102 and the respective DMA hardware sequencers 114, VPUs 116, PPEs 118, and caches 120 of the functional blocks 110. In some embodiments, the VMEMs 112 can receive and store the sensor data obtained from the memory 108. For example, the VMEMs 112 can receive and store the sensor data obtained from the memory 108 by the DMA hardware sequencers 114. Additionally, or alternatively, VMEMs 112 can receive and store the sensor data obtained from the memory 108 via the instruction switch 106. In some embodiments, the VMEMs 112 can interconnect with the PPEs 118 via decoupled load/store units (DLSUs) 124. As described herein, the DLSUs 124 can be configured to buffer data communicated between the VMEMs 112 and the PPEs 118 to reduce latencies associated with communication between the VMEMs 112 and the PPEs 118.

The DMA hardware sequencers 114 can include one or more processors that control the execution of one or more instructions. For example, the DMA hardware sequencers 114 can receive instructions from the processor 102, the respective VPUs 116 or PPEs 118, and/or a storage device (e.g., a device associated with the DMA hardware sequencers 114 such as internal or external memory, not explicitly shown) and the DMA hardware sequencers 114 can coordinate with the respective VPUs 116 and/or the PPEs 118 to perform one or more operations during execution of the instructions. In one illustrative example, the DMA hardware sequencers 114 can receive instructions that cause the DMA hardware sequencers 114 to obtain data (e.g., sensor data and/or the like) from the memory 108 and store the data in the respective VMEMs 112. In some embodiments, the DMA hardware sequencers 114 can perform one or more operations based at least in part on the data obtained from the memory 108. For example, the DMA hardware sequencers 114 can pad frames (e.g., image frames), manipulate addresses, manage overlapping data, manage different traversal orders, account for different frame sizes, and/or the like. In some embodiments, the DMA hardware sequencers 114 can receive signals (e.g., from the VPUs 116 or PPEs 118) indicating that one or more operations were performed on the data stored in the VMEMs 112, update one or more descriptors based at least in part on the updates to the data, and again perform operations on the data.

The VPUs 116 can include one or more processors that execute one or more instructions. For example, the VPUs 116 can receive instructions from the processor 102 and the respective VPUs 116 can coordinate with the DMA hardware sequencers 114 and/or PPEs 118 to perform the one or more operations during execution of the instructions. In one illustrative example, the VPUs 116 can receive instructions from the processor 102 that cause the VPUs 116 to trigger respective DMA hardware sequencers 114 to obtain sensor data from the memory 108 and store the sensor data in the respective VMEMs 112. In examples, the VPUs 116 can process the data stored in the respective VMEMs 112 and write data back to the VMEMs 112. In these examples, the data written by the VPUs 116 into respective VMEMs 112 can include updated sensor data and/or data generated based at least in part on analysis performed by the VPUs 116 on the sensor data, including object or feature locations within a frame, a classification indicating a type of an object or agent, and/or the like. In some embodiments, the VPUs 116 can provide (e.g., send, transmit, transfer, etc.) a signal to the respective DMA hardware sequencers 114 to cause the DMA hardware sequencers 114 to update one or more descriptors (described herein). For example, the VPUs 116 can send a signal to the respective DMA hardware sequencers 114 to cause the DMA hardware sequencers 114 to update one or more descriptors based at least in part on the data written by the VPUs 116 to the respective VMEMs 112.

The PPEs 118 can include one or more processors that execute one or more instructions. For example, the PPEs 118 can receive instructions from the processor 102 and the respective PPEs 118 can coordinate with the DMA hardware sequencers 114 and/or VPUs 116 to perform the one or more operations during execution of the instructions. In one illustrative example, the PPEs 118 can receive instructions from the processor 102 that cause the PPEs 118 to trigger respective DMA hardware sequencers 114 to obtain (e.g., receive, acquire, capture, etc.) sensor data from the memory 108 and store the sensor data in the respective VMEMs 112. In examples, the PPEs 118 can process the data stored in the respective VMEMs 112 and write data back to the VMEMs 112. In these examples, the data written by the PPEs 118 into respective VMEMs 112 can include updated sensor data and/or data generated based at least in part on analysis performed by the PPEs 118 on the sensor data, including object or feature locations within a frame, a classification indicating a type of an object or agent, and/or the like. In some embodiments, the PPEs 118 can send a signal to the respective DMA hardware sequencers 114 to cause the DMA hardware sequencers 114 to update one or more descriptors (described herein). For example, the PPEs 118 can send a signal to the respective DMA hardware sequencers 114 to cause the DMA hardware sequencers 114 to update one or more descriptors based at least in part on the data written by the PPEs 118 to the respective VMEMs 112.

The caches 120 can include a storage device that is interconnected with the VMEMs 112 and/or the instruction switch 106. As noted above, the caches 120 can receive data associated with instructions from the instruction switches 106 and load the instructions into one or more devices of the functional blocks 110 to cause the one or more devices to operate in accordance with the instructions. The DLUTs 122 can include a processor and/or memory configured to store one or more lookup tables. In some embodiments, the DLUTs 122 can be configured to enable communication between the processor 102 and one or more components of the functional blocks 110. For example, the DLUTs 122 can be configured to be in communication with the processor 102 and/or one or more memory devices of FIG. 1 (e.g., the memory 108 and/or the memory 104). The DLUT 122 can then manage the data storage and retrieval process between the processor 102 and the one or more memory devices of FIG. 1. The DLSUs 124 can include a storage device that is interconnected with the VMEMs 112 and PPEs 118 of a given functional block 110. For example, the DLSUs 124 can receive and store the sensor data obtained by the VMEMs 112 from the memory 108. Additionally, or alternatively, the DLSUs 124 can receive and store the data provided as an output by the PPEs 118.

Figure 2:
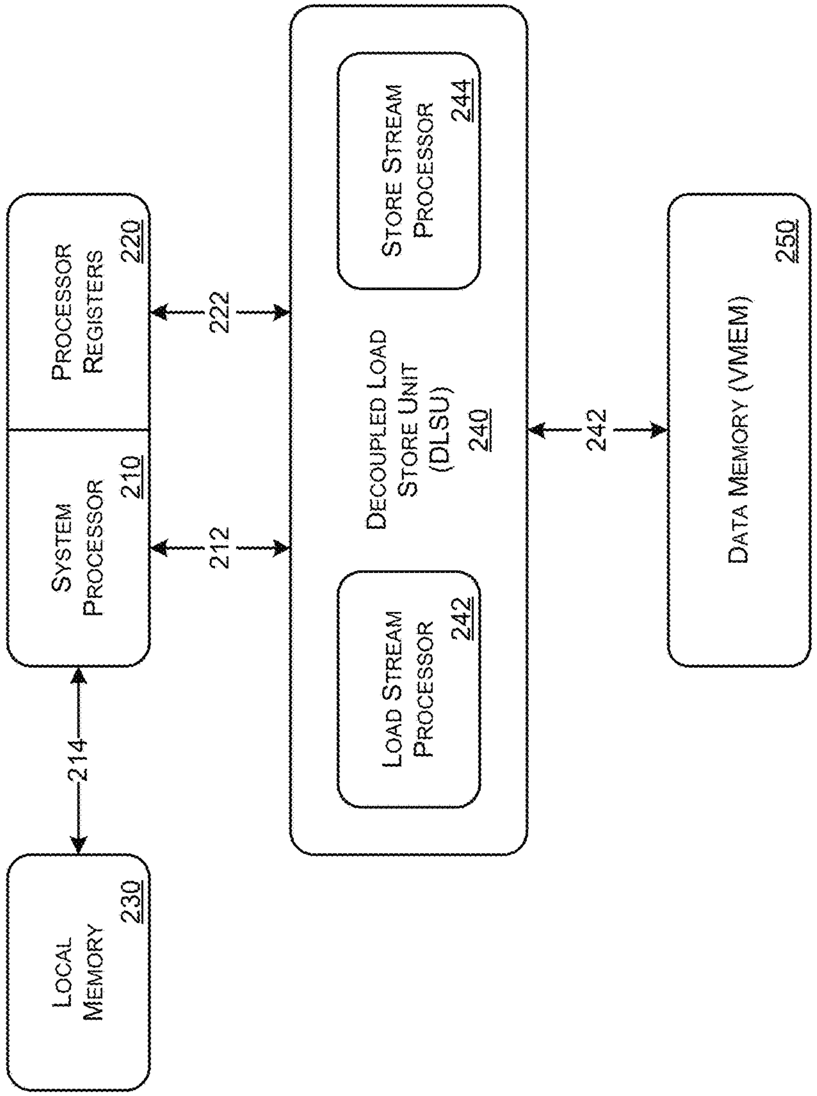
FIG. 2 depicts an example load store memory architecture, in accordance with some embodiments of the present disclosure.

FIG. 2 depicts an example load store memory architecture, according to this disclosure. As illustrated by way of example in FIG. 2, a load store memory architecture 200 can include at least a system processor 210, a processor direct I/O channel 212, a processor memory I/O channel 214, a register I/O channel 222, a local memory 230, a decoupled load store unit (DLSU) 240, and a data memory 250.

The system processor 210 can execute one or more instructions associated with the load store memory architecture 200. The system processor 210 can include an electronic processor, an integrated circuit, or the like including one or more of digital logic, analog logic, digital sensors, analog sensors, communication buses, volatile memory, nonvolatile memory, and the like. The system processor 210 can include, but is not limited to, at least one microcontroller core, microprocessor core, central processing core, graphics processing core, physics processing core, or the like. The system processor 210 or the load store memory architecture 200 generally can include one or more communication bus controllers to effect communication between the system processor 210 and the other elements of the load store memory architecture 200. The system processor 210 can include processor registers 220.

The processor registers 220 can store one or more instructions that can be executed by the system processor 210 according to one or more processing elements of the system processor 210. For example, the processor registers 220 can each store a word of a predetermined length that the system processor 210 can execute. For example, the word can have a predetermined length corresponding to a bit-length capacity of the system processor 210 or a component thereof. For example, the predetermined length can be 8 bits, 32 bits, or 64 bits, but is not limited thereto. For example, the system processor 210 can execute a given word from a register of the processor registers 220 in a given cycle. For example, the system processor 210 and the processor registers 220 can be integrated into a common wafer, die or package, but are not limited thereto.

Vector processing using SIMD is a common technique used in programmable processors to accelerate applications that have data level parallelism. The SIMD instructions operate on the Register File requiring a match between the number of vector elements processed by the datapath and the vector elements being supplied or written into the register file. The register files are sized to provide high bandwidth to the datapath with low latency of read and writes.

The width of the register file is sized to match the SIMD datapath to enable a compiler to efficiently schedule operations to maximize the use of the SIMD datapath resources. Due to the low access latency requirement, the Vector Register File and SIMD data paths are implemented in close physical proximity, so sizing the two together is common practice. The data memory, on the other hand, is independently architected and potentially shared across multiple processing engines.

The processor direct I/O channel 212 can provide communication between the system processor 210 and the local memory 230. For example, the processor direct I/O channel 212 can communicatively couple the system processor 210 and the local memory 230. The processor direct I/O channel 212 can communicate one or more instructions, signals, conditions, states, or the like between one or more of the system processor 210 and the local memory 230. The processor direct I/O channel 212 can include one or more digital, analog, or like communication channels, lines, traces, or the like. For example, the processor direct I/O channel 212 can include a first communication bus having at least one serial or parallel communication line among multiple communication lines of a communication interface integrated with the system processor 210. The processor memory I/O channel 214 can provide communication between the system processor 210 and the DLSU 240. For example, the processor memory I/O channel 214 can communicatively couple the system processor 210 and the DLSU 240. The processor memory I/O channel 214 can communicate one or more instructions, signals, conditions, states, or the like between one or more of the system processor 210 and the DLSU 240. The processor memory I/O channel 214 can include one or more digital, analog, or like communication channels, lines, traces, or the like. For example, the processor memory I/O channel 214 can include a second communication bus having at least one serial or parallel communication line among multiple communication lines of the communication interface integrated with the system processor 210.

The register I/O channel 222 can provide communication between the processor registers 220 and the DLSU 240. For example, the register I/O channel 222 can communicatively couple the processor registers 220 and the DLSU 240. The register I/O channel 222 can communicate one or more instructions, signals, conditions, states, or the like between one or more of the processor registers 220 and the DLSU 240. The register I/O channel 222 can include one or more digital, analog, or like communication channels, lines, traces, or the like. For example, the register I/O channel 222 can include a third communication bus having at least one serial or parallel communication line among multiple communication lines of the communication interface integrated with the processor registers 220. The local memory 230 can store one or more instructions for operating components of the system processor 210 and operating components operably coupled to the system processor 210. For example, the one or more instructions can include one or more of firmware, software, hardware, operating systems, embedded operating systems. For example, the local memory 230 can correspond to a solid-state memory device, flip flop array, register array, or any combination thereof, but is not limited thereto.

The DLSU 240 can provide data between the system processor 210 and the data memory 250 to mitigate or prevent waiting by the system processor 210 for data transfer with the data memory 250. The system processor 210 can cause the DLSU 240 to be configured to accommodate a latency of the data memory 250. For example, the DLSU 240 can be configured to prefetch a predetermined number of instructions at a predetermined frequency from the data memory 250, and provide the prefetched instructions to the system processor 210 at a rate corresponding to the system processor 210 to prevent stalling of the system processor 210. Thus, the DLSU 240 can decouple fetching operations for the data memory 250 from the read and write operations of the system processor 210, to provide a technical improvement to allow a faster processor to reliably read and write with a slower memory at the silicon level. The decoupled load store unit (DLSU) 240 can include a load stream processor 242, and a store stream processor 244. The decoupled load store unit (DLSU) 240 can include one or more logical or electronic devices including but not limited to integrated circuits, logic gates, flip flops, gate arrays, programmable gate arrays, and the like.

In an aspect, the DLSU 240 implements the load stream processor 242 and the store stream processor 244, allowing multiple load/store operations to be issued from a processor pipeline and to be handled in the background by the DLSU 240. The sizing of buffers (e.g., queues) of the load stream processor 242 and the store stream processor 244 can be based on a number of inflight load/stores to support active operation continuously by the system processor 210 with the DLSU fetching with the data memory 250 in the background. For example, if a load queue or a store queue is full and the processor issues another vector load or store operation, the processor can become stalled until a queue can accept data. For example, the DLSU can include one or more queue structures to ensure that the loads and stores are processed in the order they are issued by the processor, to provide a technical improvement to ensure memory ordering, but are not limited thereto.

The load stream processor 242 can load one or more instructions from the data memory 250 during at least one given cycle. For example, the load stream processor 242 can load a number of instructions during a cycle of the data memory 250, where the number of instructions correspond to a number of instructions that can be executed by the system processor 210. The load stream processor 242 can include one or more logical or electronic devices including but not limited to integrated circuits, logic gates, flip flops, gate arrays, programmable gate arrays, and the like. The load stream processor 242 can be fabricated on a silicon device (e.g., a die or wafer) of the DLSU 240, or otherwise integrated with the DLSU 240. Thus, the load stream processor 242 can provide a technical improvement of low latency on-die prefetching of data from a lower-speed device (e.g., the data memory 250) to a higher-speed device (e.g., the system processor 210).

The store stream processor 244 can store one or more instructions to the data memory 250 during at least one given cycle. For example, the store stream processor 244 can store a number of instructions during a cycle of the data memory 250, where the number of instructions correspond to a number of instructions that can be executed by the system processor 210. The store stream processor 244 can include one or more logical or electronic devices including but not limited to integrated circuits, logic gates, flip flops, gate arrays, programmable gate arrays, and the like. The store stream processor 244 can be fabricated on a silicon device (e.g., a die or wafer) of the DLSU 240, or otherwise integrated with the DLSU 240. Thus, the store stream processor 244 can provide a technical improvement of low latency on-die prebuffering of data from a higher-speed device (e.g., the system processor 210) to a lower-speed device (e.g., the data memory 250).

The data memory 250 can store data associated with the system processor 210. The data memory 250 can include one or more hardware memory devices to store binary data, digital data, or the like. The data memory 250 can include one or more electrical components, electronic components, programmable electronic components, reprogrammable electronic components, integrated circuits, semiconductor devices, flip flops, arithmetic units, or the like. The data memory 250 can include at least one of a non-volatile memory device, a solid-state memory device, a flash memory device, or a NAND memory device. The data memory 250 can include one or more addressable memory regions disposed on one or more physical memory arrays. A physical memory array can include a NAND gate array disposed on, for example, at least one of a particular semiconductor device, integrated circuit device, and printed circuit board device. For example, the data memory 250 can be fabricated on a silicon device (e.g., a die or wafer) of the DLSU 240, or otherwise integrated with the DLSU 240. The data memory can have a memory hardware architecture with a larger memory capacity than the local memory 230 (e.g., NAND memory integrated into a die) to accommodate storage of large volumes of data at batch processing speeds that are lower than processing speeds of the system processor 210. For example, input and output data-structures that can be much larger than the capacity of the local memory 230 or the processor registers 220, are stored in the data memory 250. The data memory 250 is thus sized for larger capacity at the expense of bandwidth and access latency. The DLSU 240 can thus provide a technical solution to move data between the processor registers 220 and the data memory 250, to provide a technical improvement of maintaining data throughput at a level sufficient to prevent stalling of the system processor 210.

In an aspect, the DLSU 240 can provide, concurrently with the data between the first processor and the memory device at the first latency, the data between the second processor and the stream processor at the second latency. For example, the first processor corresponds to the DLSU 240, the memory device corresponds to the data memory 250, and the second processor corresponds to the system processor 210. For example, the first latency corresponds to a processing speed of the data memory 250, and the second latency corresponds to a processing speed of the system processor 210. For example, the processing speed of the data memory 250 is lower than the processing speed of the system processor 210.

In an aspect, the system is configured to provide a number of instructions of the data during a cycle. For example, the number of instructions corresponds to a number of instructions that can be executed by the system processor 210 in a time period between read or write operations of the data memory 250. For example, if the system processor 210 can execute 10 instructions in the time required to fetch data from the data memory 250, the DLSU can be configured to pre-fetch 10 instructions in a single read request to the data memory 250. In an aspect, the number of instructions is based on at least one of the dimension of the memory device or a length of a buffer of the stream processor. For example, the dimension of the memory device can correspond to an arrangement of data in the data memory 250 according to one or more rows and columns of the data memory 250. The DLSU 240 can be configured to fetch and load, or buffer and store, data with the data memory 250 according to the dimensions of the data memory 250, to provide a technical improvement to rapidly load and store data at the processor hardware level to eliminate processor stalling due to memory latency.

The system processor 210 can execute one or more instructions associated with the memory architecture 200. The system processor 210 can include an electronic processor, an integrated circuit, or the like including one or more of digital logic, analog logic, digital sensors, analog sensors, communication buses, volatile memory, nonvolatile memory, and the like. The system processor 210 can include, but is not limited to, at least one microcontroller unit (MCU), microprocessor unit (MPU), central processing unit (CPU), graphics processing unit (GPU), physics processing unit (PPU), embedded controller (EC), or the like. The system processor 210 can include a memory operable to store or storing one or more instructions for operating components of the system processor 210 and operating components operably coupled to the system processor 210. For example, the one or more instructions can include one or more of firmware, software, hardware, operating systems, and embedded operating systems. The system processor 210 or the memory architecture 200 generally can include one or more communication bus controllers to effect communication between the system processor 210 and the other elements of the memory architecture 200.

Figure 3:
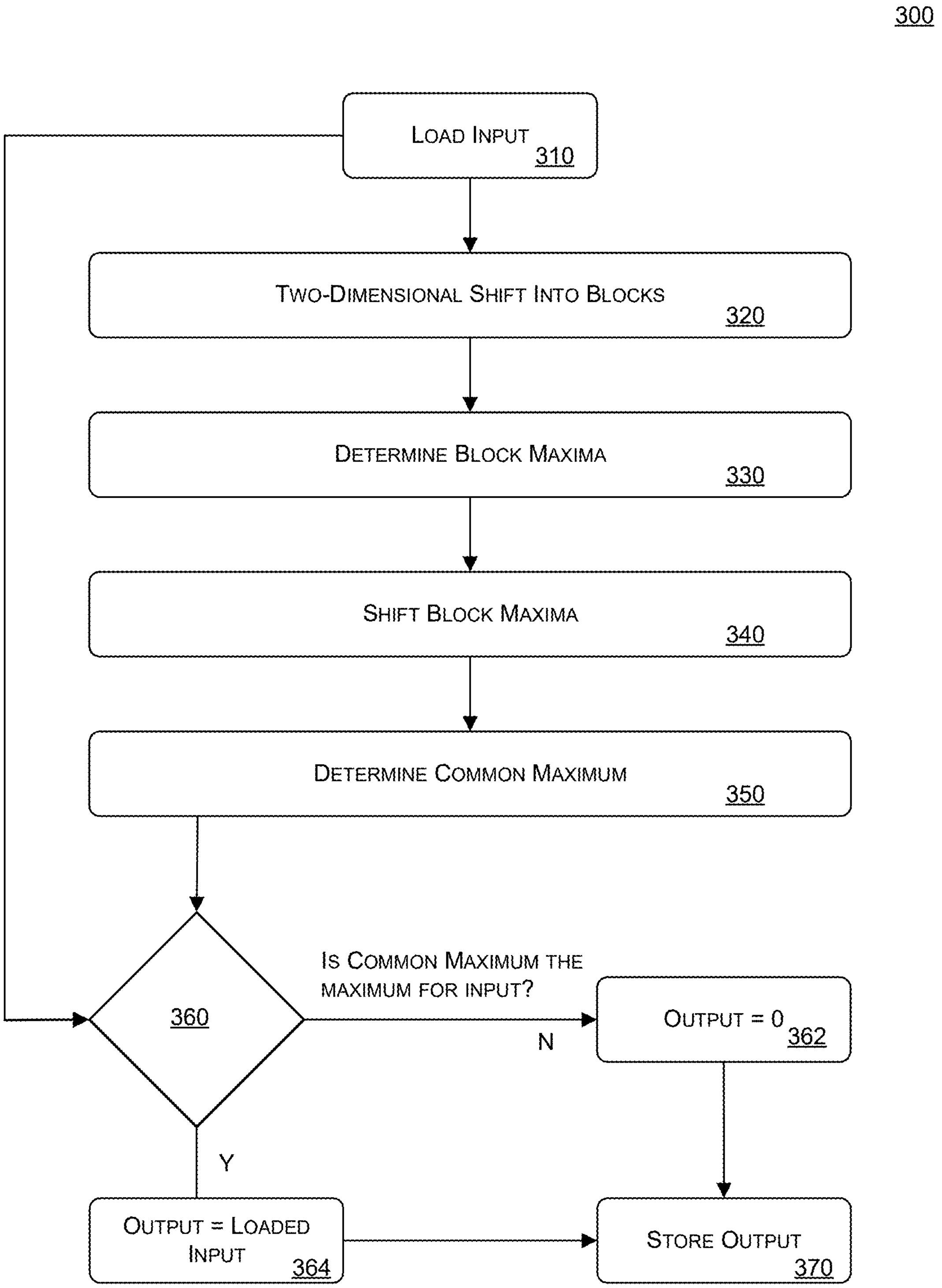
FIG. 3 depicts an example method of detection of two-dimensional maxima, in accordance with some embodiments of the present disclosure.

FIG. 3 depicts an example method of detection of two-dimensional maxima, according to this disclosure. At least the environment 100, the memory architecture 200, or any component thereof, can perform method 300. In an aspect, method 300 is directed to an example process to offload Harris corner and NMS functions from a VPU, to execute on a PPE. In an aspect, a PPE can include one or more processing elements (PEs). For example, each PE corresponds to a discrete semiconductor processor associated with a position in an X axis and a Y axis. Collectively, each of the PEs can correspond to a 2D array of the PPE and can receive corresponding data in the two dimensions, to effect two-dimensional concurrent processing by the PPE. For example, each PPE can include its own corresponding set of PEs arranged in the 2D configuration or associated with a 2D configuration as discussed herein. For example, as camera resolution increases, video and image frame data size correspondingly increases. In response, a computation workload for a feature detection algorithm increases significantly, resulting in a significant (e.g., geometric rate) increase of execution time for feature processing operations (e.g., Harris corner and NMS). As discussed herein at least with respect to method 300, one or more PPE devices can augment the VPU. Here, 2D processing via the SIMD architecture of the PPE device can provide a technical improvement to significantly reduce computation time in latency-sensitive deployments, by a technical solution including 2D parallelism to image feature recognition operations. For example, the PPE is suitable for applications which are computation-heavy and have operations on 2D data like Harris corner and NMS.

In an aspect, Harris corner and NMS can operate on a pixel level. For example, Harris corner operations can execute on image pixels to identify positions and characteristics of visual properties in an image (e.g., corners). For example, NMS can execute on Harris corner output corners to identify positions and characteristics of local maxima as final corners. Computationally, a CPU can process one pixel at a time, a VPU can process a 1D vector of pixels at a time, and a PPE can process a 2D block of pixels at a time. Method 300 is directed to an example set of instructions to transfer feature processing data between VPU and PPE devices, to achieve offloading of Harris corner and NMS operations from a VPU to a PPE. For example, PEs of a PPE can receive 2D blocks according to an VPU transfer instruction set (VXfer). Vxfer can also be referred to as a PPE instruction set. The VXfer instruction set controls data movement between neighboring PEs. For example, the PPE or VPU moves data between neighboring PEs in a North direction by a northward VPU transfer instruction (VXferNorthW). For example, the PPE or VPU moves data between neighboring PEs in a South direction by a southward VPU transfer instruction (VXferSouthW). For example, the PPE or VPU moves data between neighboring PEs in an East direction by an eastward VPU transfer instruction (VXferEastW). For example, the PPE or VPU moves data between neighboring PEs in a West direction by a westward VPU transfer instruction (VXferWestW). By using this feature with 2 blocks of data, data can be re-used to avoid redundant loading. For example, executing an NMS operation on a 5×5 block of pixels via one or more VPUs can involve loading 5 rows and loading 5 columns of pixel data for each NMS operations, whereas executing the same NMS operation on the same 5×5 block of pixels via one or more PEs can involve 1 block of data with a total of 8 VXfer instructions. Thus, the number of load operations can be greatly reduced and speed of execution of feature processing and recognition can be greatly increased. At least a VPU, a PPE, or a PE of a PPE as discussed herein can execute any of the instructions of method 300 as discussed by way of example.

At 310, the method 300 can load input. For example, the VXfer instruction set can include a load instruction (VLoad) that takes as input input data (IN), and an identifier or an address of a target location at a PPE device, including, for example, an input buffer (Input_Buffer) associated with one or more target PE devices. Thus, the method 300 can execute an instruction according to Equation 1:

$$VLoad(\text{IN, Input\_Buffer}) \quad \text{(Eqn. 1)}$$

At 320, the method 300 can perform one or more two-dimensional shifts to provide one or more blocks to one or more neighboring PEs, based on the loaded input. For example, the VXfer instruction set can include the VXferEastW instruction, that takes as input the input data (IN), one or more in-shifted pixel values to be shifted into the block (SP), and provides as output a 2D block including the shifted input incorporated with the in-shifted pixel values in the eastward direction (In_E1). For example, VXferEastW can include in-shifted pixel values corresponding to zeroes (S0). The in-shifted values S0 can represent that data from a neighboring block (e.g., from the castward direction) is not provided or is not available. For example, S0 values can correspond to "null" or placeholder" values to effectuate XOR operations as discussed herein. For example, VXferEastW can include in-shifted pixel values corresponding to In_E1 to represent that data from a neighboring block from the eastward direction is provided. VXferEastW using In_E1 can be executed subsequent to the VXferEastW using S0 as input, to further shift data into a neighboring block in the eastward direction. For example, the VXfer instruction set can include the VXferWestW instruction, that takes as input IN and SP, and provides as output a 2D block including the shifted input incorporated with the in-shifted pixel values in the westward direction (In_W1). For example, VXferWestW can include S0 to represent that data from a neighboring block from the westward direction is not provided or is not available. For example, VXferWestW can include in-shifted pixel values corresponding to In_W1 to represent that data from a neighboring block from the westward direction is provided. VXferWestW using In_E1 can be executed subsequent to the VXferWestW using S0 as input, to further shift data into a neighboring block in the westward direction. Thus, the method 300 can execute one or more instructions according to Equations 2-5:

$$VXferEastW(\text{IN}, S0) >> \text{In\_E1} \quad \text{(Eqn. 2)}$$

$$VXferWestW(\text{IN}, S0) >> \text{In\_W1} \quad \text{(Eqn. 3)}$$

-continued $$VXferEastW(\text{In\_E1}, S0) >> \text{In\_E2} \quad \text{(Eqn. 4)}$$

$$VXferWestW(\text{In\_W1}, S0) >> \text{In\_W2} \quad \text{(Eqn. 5)}$$

At 330, the method 300 can determine block maxima of one or more 2D blocks (e.g., by each PE having a block transferred thereto). For example, the VXfer instruction set can include a local maximum instruction (VMaxW), that takes as input at least one of IN, In_E1, In_W1, In_E2, or In_W2, and provides as output an identification of one or more pixels corresponding to a local maximum of the block (HMax). VMaxW can also take as input HMax from a previous VMaxW instruction operation, to update the HMax value based on a plurality of blocks to provide a 2D local maximum based on block data rapidly processed via a plurality of PEs. Thus, the method 300 can execute one or more instructions according to Equations 6-9:

$$\text{VMaxW(IN, In\_E1)} >> \text{HMax} \quad \text{(Eqn. 6)}$$

$$\text{VMaxW(HMax, In\_W1)} >> \text{HMax} \quad \text{(Eqn. 7)}$$

$$\text{VMaxW(HMax, In\_E2)} >> \text{HMax} \quad \text{(Eqn. 8)}$$

$$\text{VMaxW(HMax, In\_W2)} >> \text{HMax} \quad \text{(Eqn. 9)}$$

At 340, the method 300 can shift block maxima, based on HMax. For example, the VXfer instruction set can include the VXferNorthW instruction, that takes as input HMax and SP, and provides as output a local maximum of the block shifted in the northward direction (HMax_N1). For example, VXferNorthW can include S0 to represent that data from a neighboring block from the northward direction is not provided or is not available. For example, VXferNorthW using HMax_N1 as input can be executed subsequent to the VXferNorthW using S0 as input, to further shift data into a neighboring block in the northward direction. For example, the VXfer instruction set can include the VXferSouthW instruction, that takes as input HMax and SP, and provides as output a local maximum of the block shifted in the southward direction (HMax_S1). For example, VXferSouthW can include S0 to represent that data from a neighboring block from the southward direction is not provided or is not available. For example, VXferSouthW using HMax_S1 as input can be executed subsequent to the VXferSouthW using S0 as input, to further shift data into a neighboring block in the southward direction. Thus, the method 300 can execute one or more instructions according to Equations 10-13:

$$VXferNorthW(\text{HMax}, S0) >> \text{HMax\_N1} \quad \text{(Eqn. 10)}$$

$$VXferSouthW(\text{HMax}, S0) >> \text{HMax\_S1} \quad \text{(Eqn. 11)}$$

$$VXferNorthW(\text{HMax\_N1}, S0) >> \text{HMax\_N2} \quad \text{(Eqn. 12)}$$

$$VXferSouthW(\text{HMax\_S1}, S0) >> \text{HMax\_S2} \quad \text{(Eqn. 13)}$$

At 350, the method 300 can determine at least one common maximum, based on one or more local maxima. For example, VMaxW can take as input at least one of HMax, HMax_N1, HMax_S1, HMax_N2, and HMax_S2, and provide as output an identification of one or more pixels corresponding to a common maximum of the block (Max). VMaxW can also take as input Max from a previous VMaxW instruction operation, to update the Max value based on a plurality of blocks to provide a 2D common maximum based on block data rapidly processed via a plurality of PEs. Thus, the method 300 can execute one or more instructions according to Equations 14-17:

$$\text{VMaxW(HMax, HMax\_N1)} >> \text{Max} \quad \text{(Eqn. 14)}$$

$$\text{VMaxW(Max, HMax\_S1)} >> \text{Max} \quad \text{(Eqn. 15)}$$

$$\text{VMaxW(Max, HMax\_N2)} >> \text{Max} \quad \text{(Eqn. 16)}$$

$$\text{VMaxW(Max, HMax\_S2)} >> \text{Max} \quad \text{(Eqn. 17)}$$

At 360, the method 300 can determine whether a common maximum, Max, is a maximum for the current input, IN. For example, the VXfer instruction set can include a comparator instruction (VCmpEQW), that takes as input at least one of Max and IN, and provides as output a binary indication of whether Max is a common maximum for IN (Is_Max). For example, if Max meets or exceeds a threshold indicative of a current or expected common maximum for IN, VCmpEQW can provide as output Is_Max having a True value. For example, if Max does not meet or exceed a threshold indicative of a current or expected common maximum for IN, VCmpEQW can provide as output Is_Max having a False value. For example, the VXfer instruction set can include a multiplexing output instruction (VMuxW), that takes as input at least one of Is_Max, IN, and S0, and provides an output (OUT) whose value depends on the binary indication of whether Max is a common maximum for IN according to Is_Max. At 362, the method 300 can provide a null output. For example, VMuxW can pass S0 to OUT according to a multiplexing state with input of Is_Max having a False value. At 364, the method 300 can provide an output equaling a received input. For example, VMuxW can pass IN to OUT according to a multiplexing state with input of Is_Max having a True value. At 370, the method 300 can store the output. For example, the VXfer instruction set can include a store instruction (VStore) that takes as input OUT, and an identifier or an address of a target location at a PE device, including, for example, an output buffer (Output_Buffer) associated with one or more target PE devices. Thus, the method 300 can execute one or more instructions according to Equations 15-17:

$$VCmpEQW(\text{Max, IN}) >> \text{Is\_Max} \quad \text{(Eqn. 15)}$$

$$VMuxW(\text{Is\_Max, IN}, S0) >> \text{OUT} \quad \text{(Eqn. 16)}$$

$$VStore(\text{OUT, Output\_Buffer}) \quad \text{(Eqn. 17)}$$

Figure 4A:
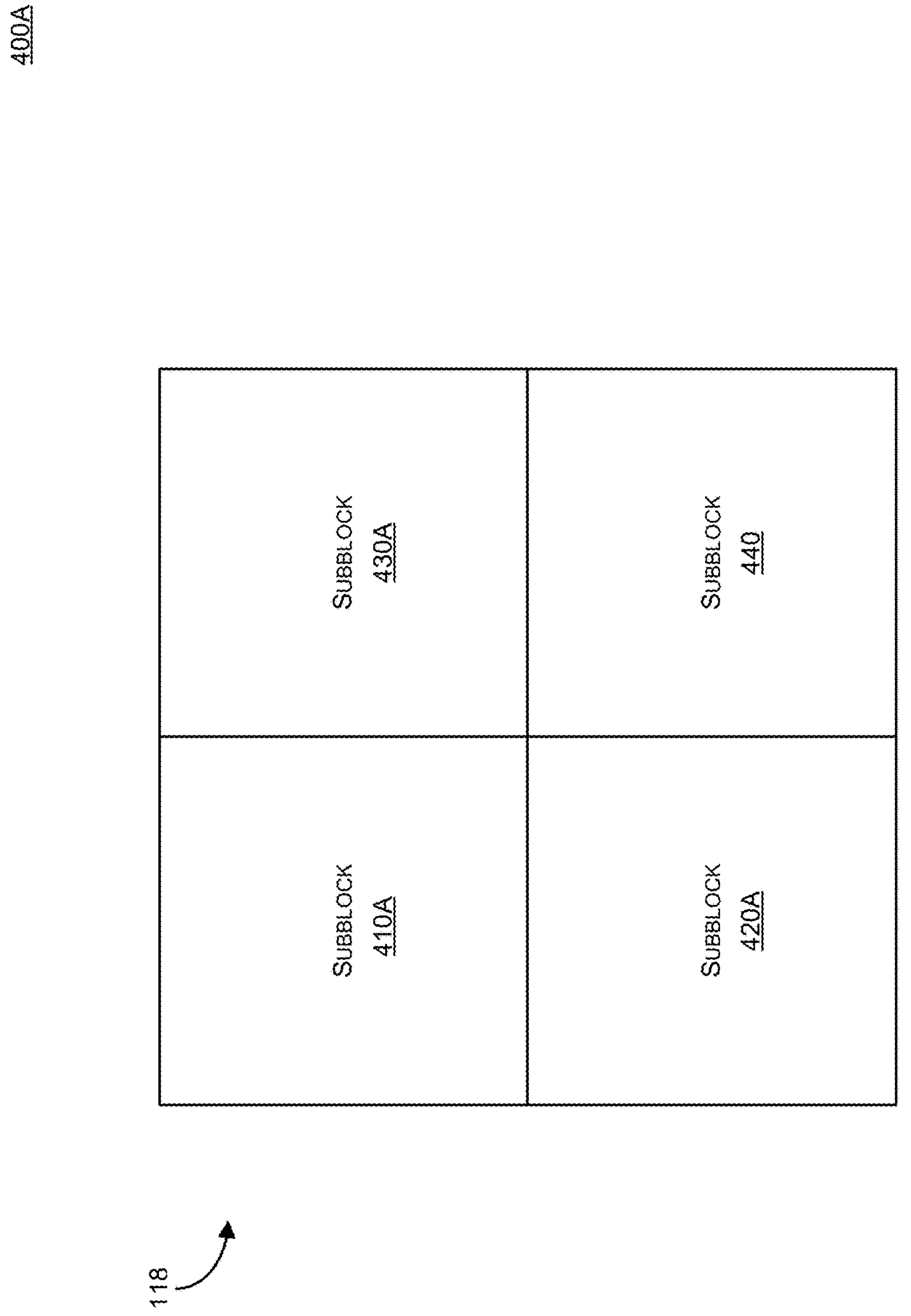
FIG. 4A depicts an example two-dimensional block state, in accordance with some embodiments of the present disclosure.

FIG. 4A depicts an example two-dimensional block state, according to this disclosure. In an aspect, this technical solution can provide a technical improvement to reduce usage of computational resources (e.g., energy, processor resources, heat dissipation capacity) by adjusting one or more configurations of tile size for blocks of image data, and re-using data at both the block level and the tile level. For example, input data for the feature detection algorithm can be split into multiple tiles, with each tile including a halo from a whole image. This technical solution can reduce computational waste by executing various block operations that incorporate re-using edge data. For example, where Harris corner and NMS have a 5×5 dependency, four extra rows and columns are needed in each of four directions. For example, where an NMS output tile size is defined as [width]× [height], then a Harris corner output tile size can be defined as [width+4]×[height+4], and the Harris corner input size can correspondingly be [width+8]×[height+8]. Thus, this technical solution can minimize or eliminate halo loss of 8 pixels in both the vertical direction and the horizontal direction. For example, the Harris corner output can be provided as an input for an NMS operation. Thus, this technical solution, at least according to FIG. 4, can provide a technical improvement to reduce computational waste at the block level. In a 2D array architecture corresponding to a PPE, a sub-block can correspond to a group of pixels mapped to corresponding PEs of the PPE. For example, for a PPE array that is 8 columns×10 rows, a subblock can be of 8×10 words (e.g., 32-bit pixels) or 16×10 halfwords (e.g., 16-bit pixels). For example, processing one subblock in the vertical direction can result in producing two lines of output, where four lines each are lost during Harris Corner and NMS operations. To minimize the pixel loss in the vertical direction, two subblocks in the vertical direction can be mapped to corresponding PEs of a PPE and processed concurrently, with the concurrent operation in the horizontal direction. As illustrated by way of example in FIG. 4A, a two-dimensional block state 400A can include at least a subblock 410A, a subblock 420A, a subblock 430A, and a subblock 440. FIG. 4A can correspond to re-use of one or more pixels in a vertical direction.

The subblock 410A can correspond to a 2D block including at least a portion of image data corresponding to a frame. The subblock 420A can correspond at least partially in one or more of structure and operation to the subblock 410A, and can be located (e.g., have a logical position defined) adjacent to the subblock 410A in the vertical direction. The subblock 430A can correspond at least partially in one or more of structure and operation to the subblock 410A, and can be located (e.g., have a logical position defined) adjacent to the subblock 410A in the horizontal direction. The subblock 440 can correspond at least partially in one or more of structure and operation to the subblock 410A, can be located (e.g., have a logical position defined) adjacent to the subblock 430A in the vertical direction, and can be located (e.g., have a logical position defined) adjacent to the subblock 420A in the horizontal direction.

Figure 4B:
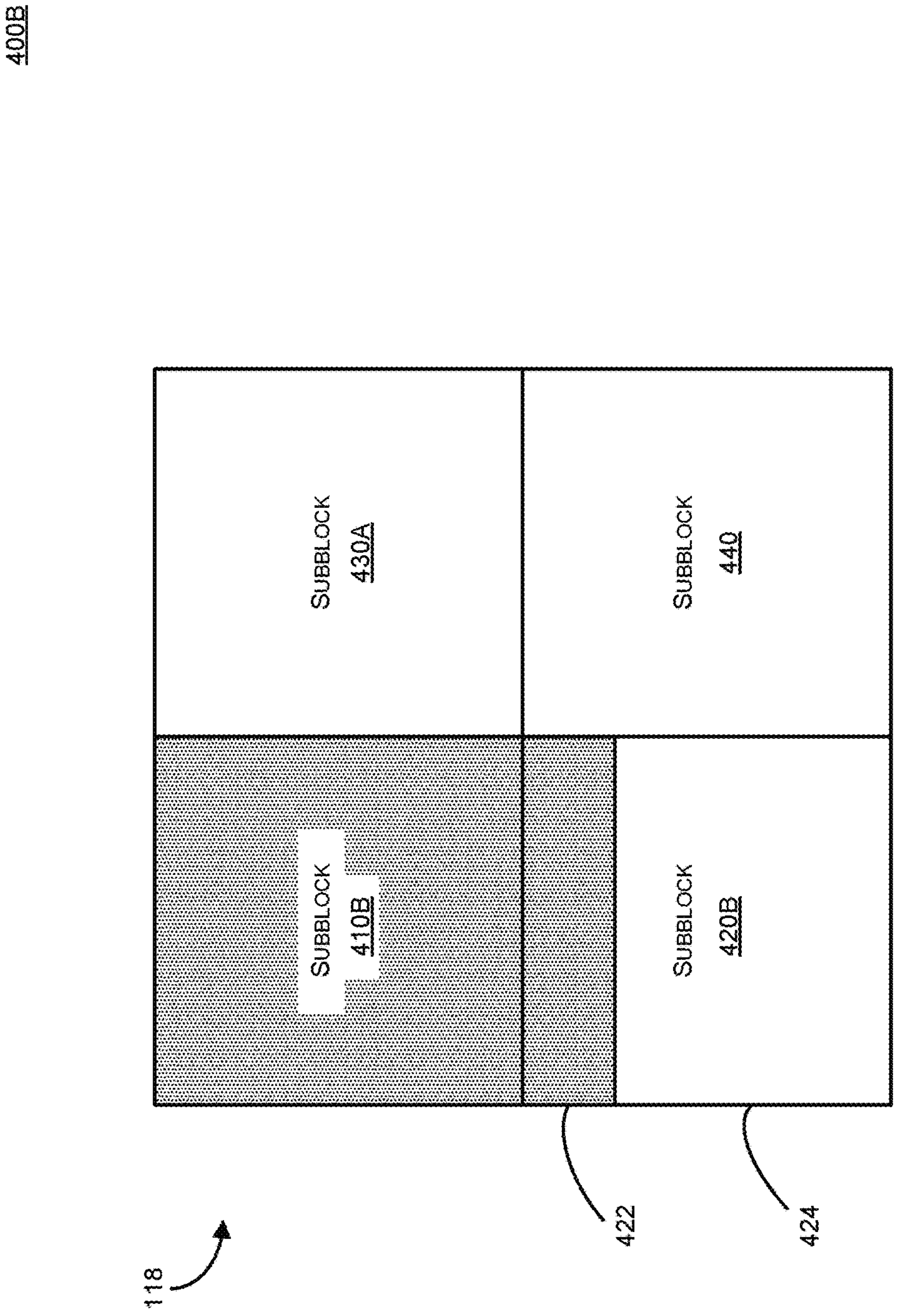
FIG. 4B depicts an example first transformed state for a two-dimensional block, in accordance with some embodiments of the present disclosure.

FIG. 4B depicts an example first transformed state for a two-dimensional block, according to this disclosure. As illustrated by way of example in FIG. 4B, a first transformed state for a two-dimensional block 400B can include at least a subblock 410B, a subblock 420B, and the subblock 430A. FIG. 4B can correspond to re-use of one or more pixels in a vertical direction, and can correspond to a state subsequent to the state 400A depicted in FIG. 4A by way of example. The subblock 410B can correspond to a 2D block including at least a portion of image data corresponding to a frame subsequent to a feature processing operation. For example, the subblock 410B can correspond to data transformed according to a Harris corner operation or an NMS operation.

The subblock 420B can correspond to a 2D block including at least a portion of image data corresponding to a frame subsequent to a feature processing operation on the subblock 410B. The subblock 420B can include a first frame output 422, and a second frame data 424. The first frame output 422 can correspond to a portion of transformed data according to data of the subblock 410B. For example, the first frame output 422 can correspond to a halo, or edge, of a Harris corner operation performed with respect to the data of the subblock 410B. For example, the halo of the Harris corner operation performed with respect to the data of the subblock 410B can be detected as a lower edge of a frame of pixels of the subblock 410B. For example, the first frame output 422 can be applied to a top portion of the subblock 420B in accordance with a determination that the subblock 420B is located below and adjacent to the subblock 410B in the vertical direction. The second frame data 424 can correspond to image data for a portion of an image adjacent to a portion of the data provided to the subblock 410A. Thus, the subblock 420B can reuse data generated by a Harris corner operation with respect to subblock 410B, and can re-use that data as input to subblock 420B, to reduce computational waste by avoiding duplicative generation of the first frame output 422 with respect to operations on multiple subblocks. For example, the first frame output 422 and the second frame data 424 can be provided as input to an NMS operation, where the first frame output 422 is generated according to a Harris corner operation.

Figure 4C:
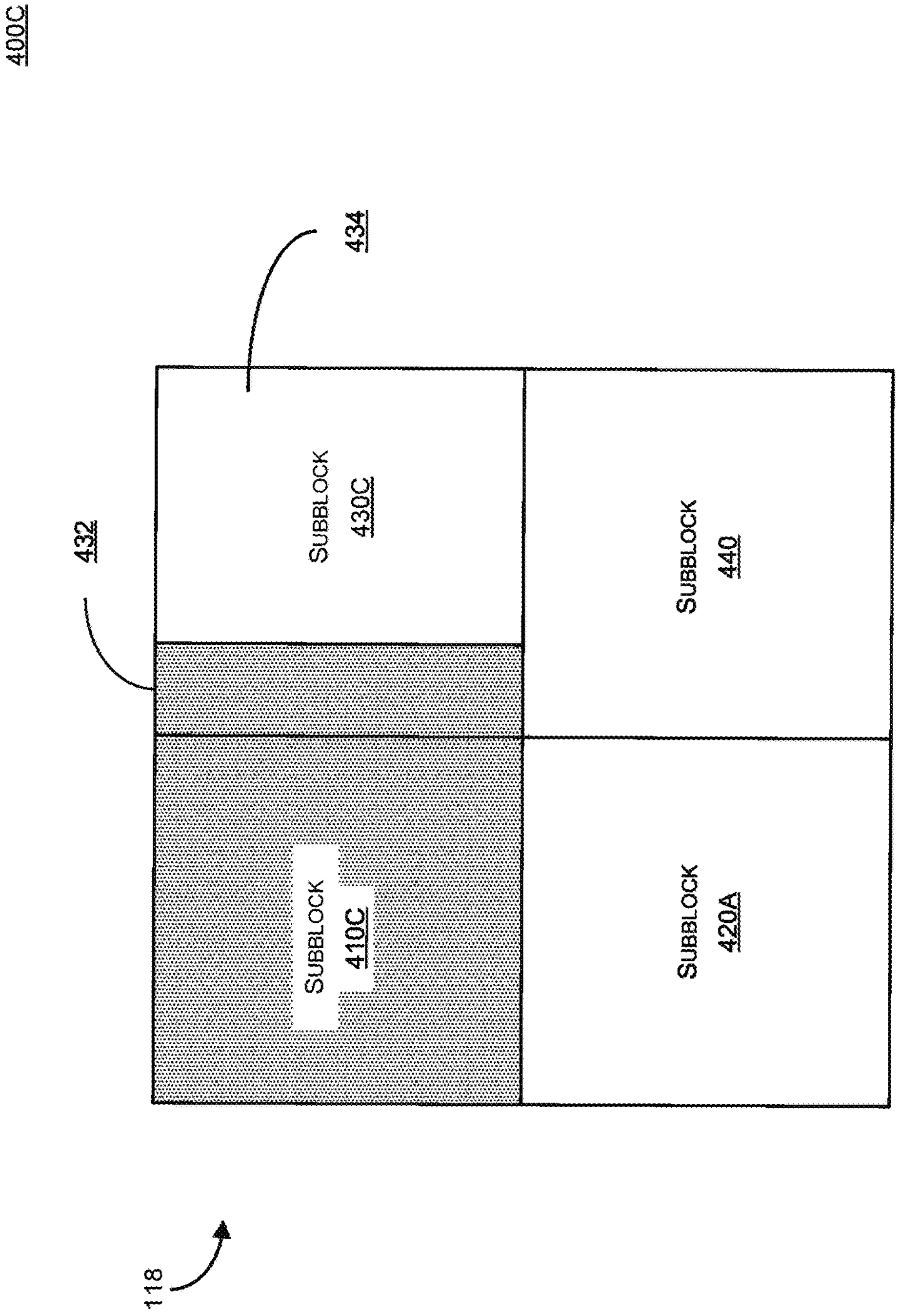
FIG. 4C depicts an example second transformed state for a two-dimensional block, in accordance with some embodiments of the present disclosure.

FIG. 4C depicts an example second transformed state for a two-dimensional block, according to this disclosure. As illustrated by way of example in FIG. 4C, a second transformed state for a two-dimensional block 400C can include at least a subblock 410C, and a subblock 430C. FIG. 4C can correspond to re-use of one or more pixels in a horizontal direction, and can correspond to a state subsequent to the state 400A depicted in FIG. 4A by way of example. The subblock 410C can correspond to a 2D block including at least a portion of image data corresponding to a frame subsequent to a feature processing operation. For example, the subblock 410C can correspond to data transformed according to a Harris corner operation or an NMS operation.

The subblock 430C can correspond to a 2D block including at least a portion of image data corresponding to a frame subsequent to a feature processing operation on the subblock 410C. The subblock 430C can include a first frame output 432, and a second frame data 434. The first frame output 432 can correspond to a portion of transformed data according to data of the subblock 410C. For example, the first frame output 432 can correspond to a halo, or edge, of a Harris corner operation performed with respect to the data of the subblock 410C. For example, the halo of the Harris corner operation performed with respect to the data of the subblock 410C can be detected as a right edge of a frame of pixels of the subblock 410C. For example, the first frame output 432 can be applied to a left portion of the subblock 430C in accordance with a determination that the subblock 430C is located to the right of and adjacent to the subblock 410C in the horizontal direction. The second frame data 434 can correspond to image data for a portion of an image adjacent to a portion of the data provided to the subblock 410A. Thus, the subblock 430C can reuse data generated by a Harris corner operation with respect to subblock 410C, and can re-use that data as input to subblock 430C, to reduce computational waste by avoiding duplicative generation of the first frame output 432 with respect to operations on multiple subblocks. For example, the first frame output 432 and the second frame data 434 can be provided as input to an NMS operation, where the first frame output 432 is generated according to a Harris corner operation.

Figure 4D:
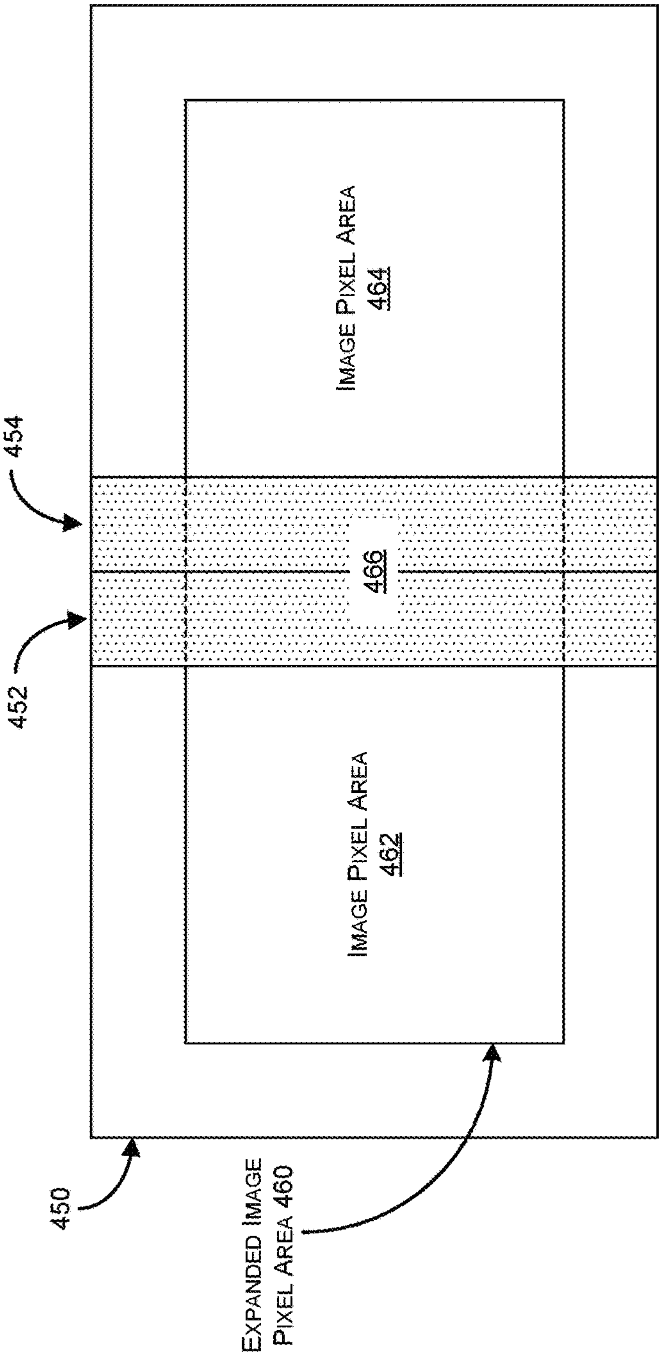
FIG. 4D depicts an example state for a horizontal image block, in accordance with some embodiments of the present disclosure.

FIG. 4D depicts an example state for a horizontal image block, according to this disclosure. As illustrated by way of example in FIG. 4D, a state for a horizontal image block 400D can include a frame portion 450 and an expanded image pixel area 460. The frame portion 450 can correspond to an edge of an image feature. For example, the frame portion 450 can correspond to a halo of the expanded image pixel area 460 or a plurality of smaller image pixel areas. The frame portion 450 can include a right frame portion 452 and a left frame portion 454.

For example, input data for a feature processing operation can be split into tiles from a whole image. Since computation of a feature processing operation (e.g., Harris corner or NMS) includes not only the image pixels inside a tile but also the halo pixels around the tile, use of larger tiles can reduce wasted computing by reducing the computation for some halo pixels in adjacent tiles. For example, a system can adjust one or more parameters for input tile size (e.g., W×H blocks) according to capacity of a VMEM, to reduce the waste computing. The expanded image pixel area 460 can correspond to a block processing architecture according to this disclosure to provide a technical improvement to reduce wasted computation by reducing the number of redundant operations The expanded image pixel area 460 can include a first image pixel area 462, a second image pixel area 464, and a reclaimed frame portion 466.

The first image pixel area 462 can correspond to a block having a size in at least one dimension less than the expanded image pixel area 460. For example, the first image pixel area 462 can have square dimensions. The second image pixel area 464 can correspond to a block having a size in at least one dimension less than the expanded image pixel area 460. For example, the second image pixel area 464 can have square dimensions matching the square dimensions of the image pixel area 462. The reclaimed frame portion 466 can correspond to a portion of the expanded image pixel area 460 that can be reclaimed from halo processing to reduce redundant computation. For example, the reclaimed frame portion 466 can be processed by one or more PPE devices as discussed herein according to rectangular dimensions greater than the square dimensions of first image pixel area 462 or the second image pixel area 464. The right frame portion 452 can correspond to a portion of a halo of the first image pixel area 462. The left frame portion 454 can correspond to a portion of a halo of the second image pixel area 464. For example, the left frame portion 454 can be adjacent to the right frame portion 452 in a horizontal direction (e.g., abutting a right edge of the right frame portion 452). Thus, operation of this technical solution according to FIG. 4D can provide a technical improvement at least to reduce redundant computation for halo pixels in dark region with larger tile size.

Figure 4E:
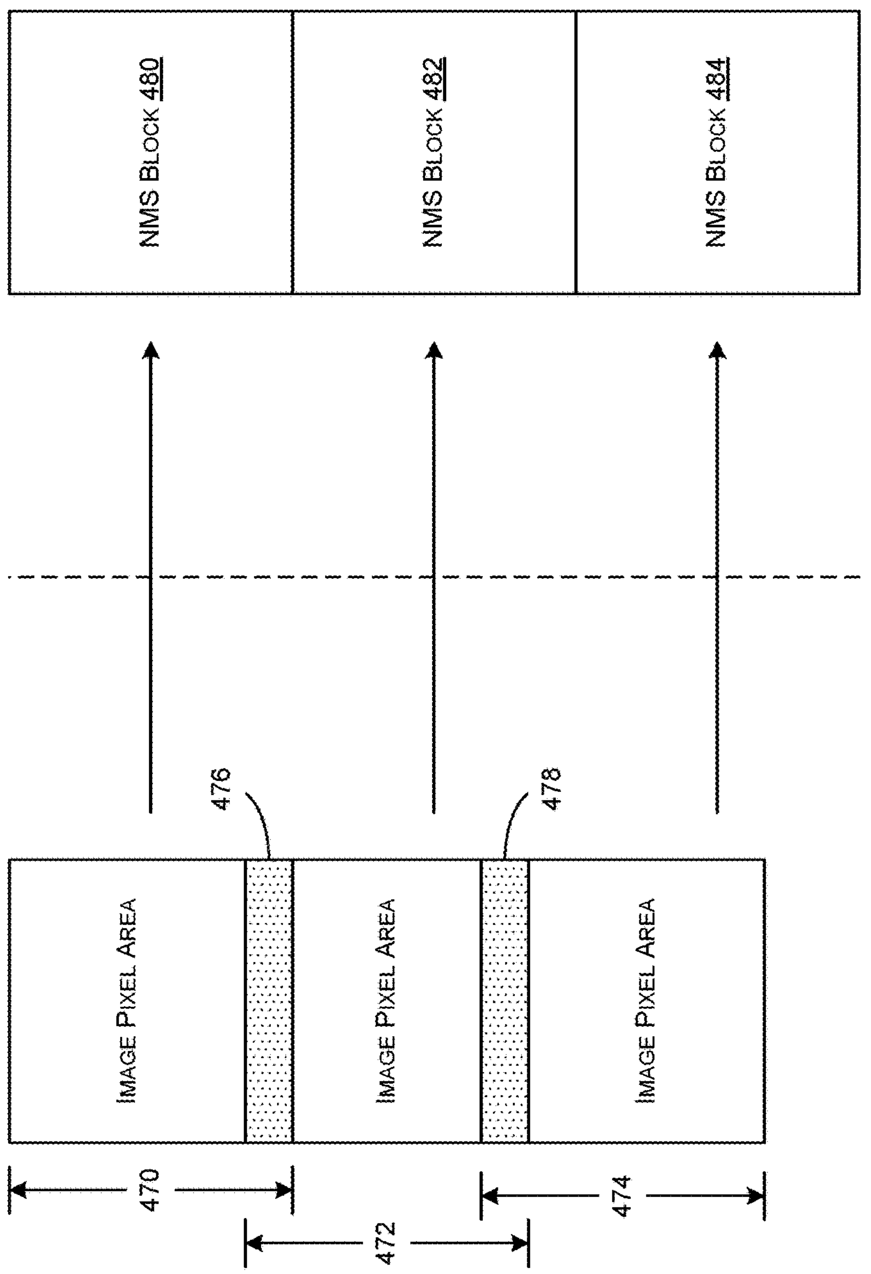
FIG. 4E depicts an example state for a plurality of vertical blocks, in accordance with some embodiments of the present disclosure.

FIG. 4E depicts an example state for a plurality of vertical blocks, according to this disclosure. As illustrated by way of example in FIG. 4E, a state for a plurality of vertical blocks 400E can include one or more vertically adjacent image pixel blocks 470, 472 and 474, and one or more NMS data blocks 480, 482 and 484. The image pixel blocks 470, 472 and 474 can correspond to blocks or subblocks as discussed herein. For example, the image pixel blocks 470, 472 and 474 can each correspond to portions of an image on which a corresponding Harris corner operation can be performed. The image pixel blocks 470, 472 and 474 can be incorporated into the image pixel blocks 470, 472 and 474 as illustrated by way of example in FIG. 4E. For example, one or more frame blocks 476 and 478 can be incorporated into the image pixel blocks 470, 472 and 474 according to the operation of FIG. 4B in the vertical direction. The NMS data blocks 480, 482 and 484 can TTT correspond to blocks or subblocks as discussed herein. For example, the NMS data blocks 480, 482 and 484 can each correspond to portions of an image on which a corresponding NMS operation can be performed, including re-used pixel data from the Harris corner operations performed on the image pixel blocks 470, 472 and 474 and the frame blocks 476 and 478. Thus, this technical solution can reduce redundant computation for halo pixels in dark region with larger tile size. For example, a bottom part of Harris corner output in one tile row can be reused in a top part of NMS input in the next tile row. Further, the system can store to L2 cache vertical context of one or more tall Harris corner outputs in one tile row, and restore the vertical context as NMS input in the next tile row, to provide a technical improvement to reduce redundant computing.

Figure 5:
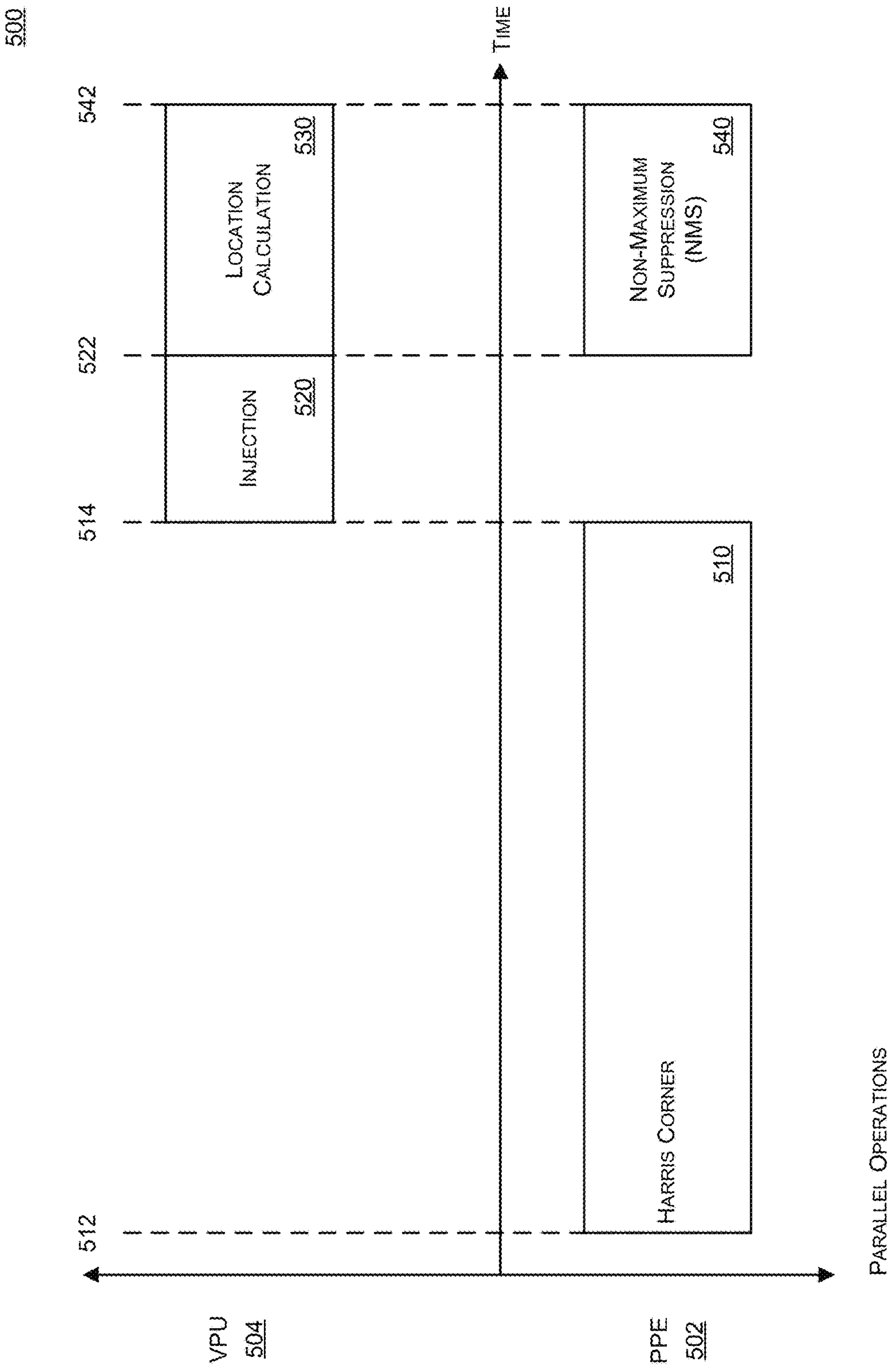
FIG. 5 depicts an example processor parallelization architecture for a single frame, in accordance with some embodiments of the present disclosure.

FIG. 5 depicts an example processor parallelization architecture for a single frame, according to this disclosure. As illustrated by way of example in FIG. 5, a processor parallelization architecture for a single frame 500 can include at least a PPE 502, a VPU 504, a first time point 512, a second time point 514, a third time point 522, and a fourth time point 542. The PPE 502 can correspond at least partially in one or more of structure and operation to the PPE 118A or 118B as discussed herein. The VPU 504 can correspond at least partially in one or more of structure and operation to the VPU 116A or 116B. The PPE 502 can execute a Harris corner operation 510, and a non-maximum suppression (NMS) operation 540.

At the first time point 512, the PPE 502 can begin to execute the Harris corner operation 510. The Harris corner operation 510 can be executed on first frame data corresponding to a first frame in a given sequence of images frames, where the given sequence of images frames corresponds to video data including a plurality of sequential image frames. At the second time point 514, the PPE 502 can complete execution of the Harris corner operation 510. The PPE 502 can communicate an indication of completion of the Harris corner operation 510, and can provide one or more instructions or data to the VPU 504 in response to the completion of the Harris corner operation 510. In response, the VPU 504 can begin executing an injection operation 520, based at least partially on data generated by the PPE 502 using the Harris corner operation 510.

At the third time point 522, the VPU 504 can complete execution of the injection operation 520, and can provide one or more instructions or data to the PPE 502 in response to the completion of the injection operation 520. In response, the PPE 502 can begin executing an NMS operation 540 based at least partially on data generated by the VPU 504 using the injection operation 520. The VPU 504 can also begin executing the location calculation operation 530, based at least partially on data generated by the VPU 504 using the injection operation 520. At the fourth time point 542, the PPE 502 can complete execution of the NMS operation 540, and the VPU 504 can complete execution of the location calculation operation 530. Thus, the PPE 502 and the VPU 504 can parallelize execution of the NMS operation 540 for the first frame data and the location calculation operation 530 for the first frame data to provide a technical improvement to increase speed of image feature processing while maintaining accuracy of image feature processing.

Figure 6:
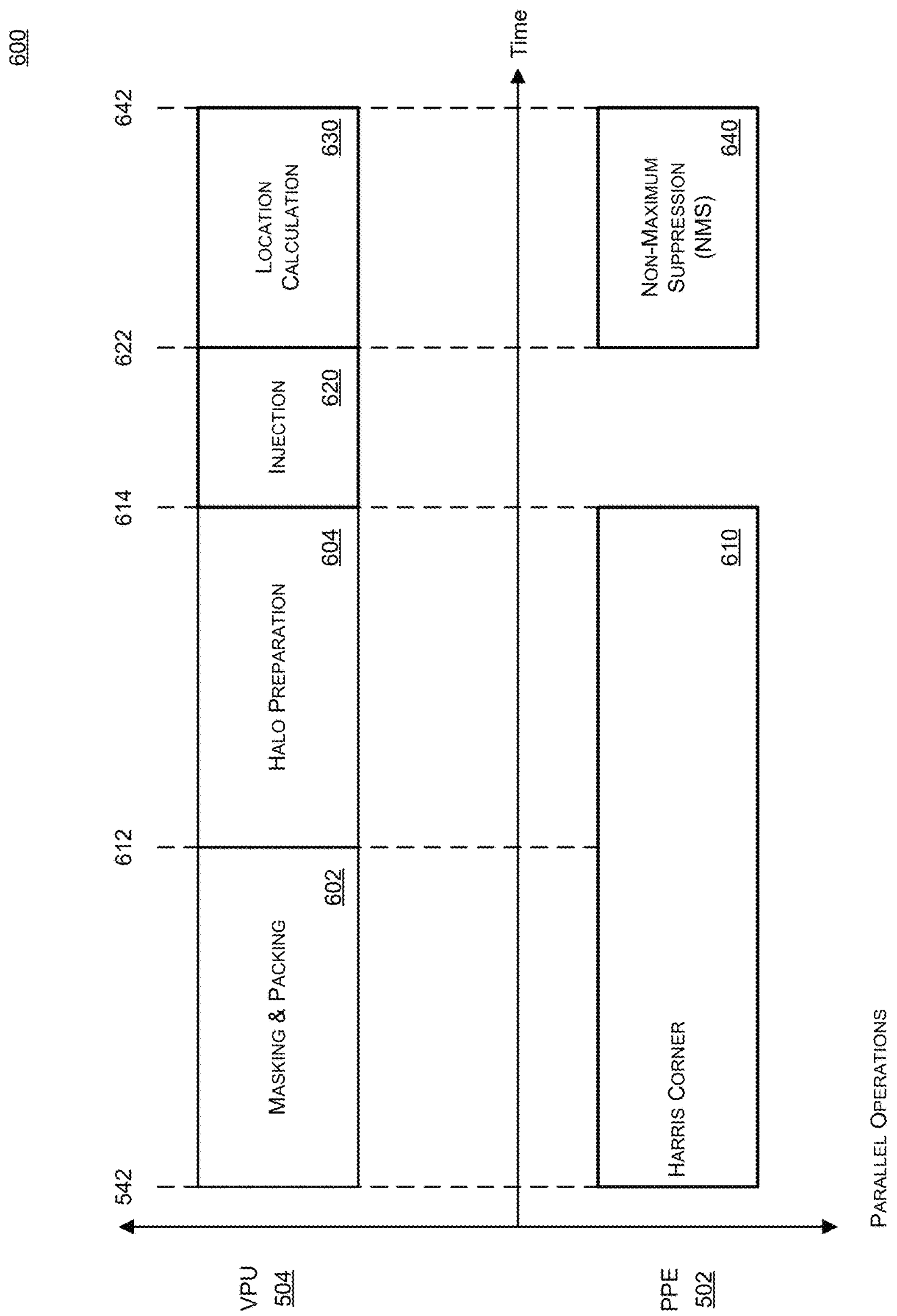
FIG. 6 depicts an example processor parallelization architecture for a plurality of frames, in accordance with some embodiments of the present disclosure.

FIG. 6 depicts an example processor parallelization architecture for a plurality of frames, according to this disclosure. As illustrated by way of example in FIG. 6, a processor parallelization architecture for a plurality of frames 600 can include at least a masking & packing operation 602, a halo preparation operation 604, a Harris corner operation for subsequent frame 610, a fifth time point 612, a sixth time point 614, an injection operation for subsequent frame 620, a seventh time point 622, a location calculation operation for subsequent frame 630, a non-maximum suppression (NMS) operation for subsequent frame 640, and an eighth time point 642.

At the fourth time point, the VPU 504 can determine that the location calculation operation 530 for the first frame data is complete, and can begin execution of a masking and packing operation 602 for the first frame data. The VPU 504 can provide one or more instructions or data to the PPE 502 in response to the completion of the location calculation operation 530. In response, the PPE 502 can begin executing the Harris corner operation 610 on second frame data corresponding to a second frame in the given sequence of images frames, where the second frame data corresponds to a frame of image data in the video data that is subsequent to the first frame data.

At the fifth time point 612, the VPU 504 can complete execution of the masking and packing operation 602 for the first frame data, and can begin execution of the halo preparation operation 604, based at least partially on data generated by the VPU 504 using the masking and packing operation 602. In parallel, the PPE 502 can continue to execute the Harris corner operation 610 on the second frame data, to provide a technical improvement to accelerate feature recognition for video data across frames.

At the sixth time point 614, the VPU can complete execution of the halo preparation operation 604, and the PPE 502 can complete execution of the Harris corner operation 610 on the second frame data. Thus, the PPE 502 and the VPU 504 can provide a technical solution to parallelize specific image feature recognition operations to accelerate feature recognition for video data across frames. The PPE 502 can communicate an indication of completion of the Harris corner operation 610, and can provide one or more instructions or data to the VPU 504 in response to the completion of the Harris corner operation 610. In response, the VPU 504 can begin executing an injection operation 620, based at least partially on data generated by the PPE 502 using the Harris corner operation 610.

At the seventh time point 622, the VPU 504 can complete execution of the injection operation 620, and can provide one or more instructions or data to the PPE 502 in response to the completion of the injection operation 620. In response, the PPE 502 can begin executing the NMS operation 640 based at least partially on data generated by the VPU 504 using the injection operation 620. The VPU 504 can also begin executing the location calculation operation 630, based at least partially on data generated by the VPU 504 using the injection operation 620. At the eighth time point 642, the PPE 502 can complete execution of the NMS operation 640, and the VPU 504 can complete execution of the location calculation operation 630. Thus, the PPE 502 and the VPU 504 can parallelize execution of the NMS operation 640 for the second frame data and the location calculation operation 630 for the second frame data to provide a technical improvement to increase speed of image feature processing while maintaining accuracy of image feature processing.

Figure 7A:
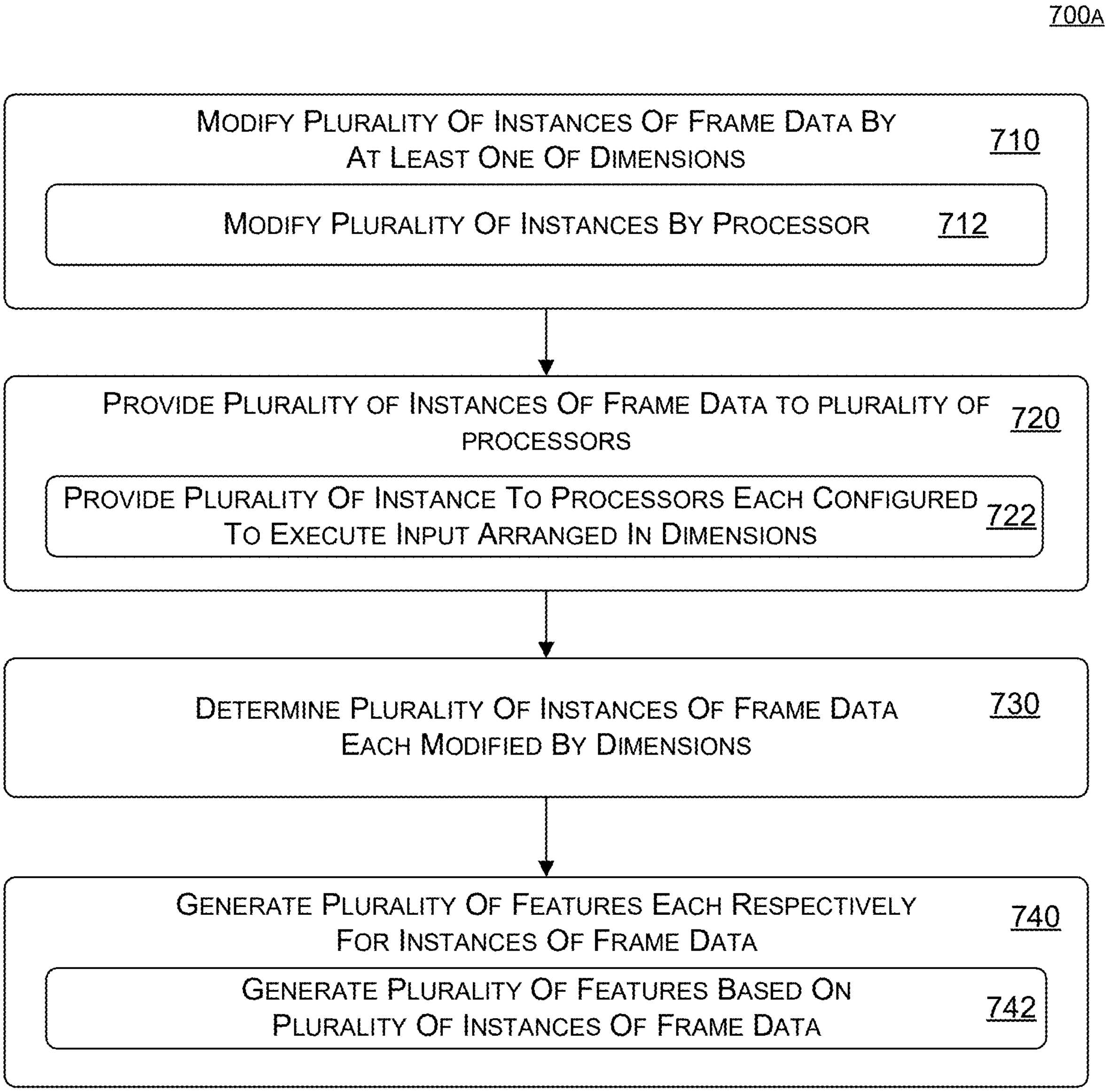
FIG. 7A depicts an example method of architecture and instruction set for multi-dimensional data processing, in accordance with some embodiments of the present disclosure.

FIG. 7A depicts an example method of architecture and instruction set for multi-dimensional data processing, according to this disclosure. At least the environment 100, the memory architecture 200, or any component thereof, can perform method 700*a*.

At 710, the method 700*a* can modify a plurality of instances of frame data according to at least one of a plurality of dimensions. For example, a plurality of instances can include a plurality of distinct data objects, where each instance is a distinct subblock. For example, a plurality of dimensions can include a horizontal (e.g., width) dimension and a vertical (e.g., height) direction. The method 700*a* can modify, based on a second instance of the plurality of instances of the frame data, the first instance according to at least one dimension of the plurality of dimensions. For example, the system can determine a first instance of the plurality of instances of the frame data, the first instance of the frame data structured in the plurality of dimensions. For example, the first instance can correspond to a first frame of the frame data at a first time with respect to a plurality of frames of video data. The system can modify, based at least in part on a second instance of the plurality of instances of the frame data, the first instance according to at least one dimension of the plurality of dimensions. At 712, the method 700*a* can modify the plurality of instances. In an aspect, the at least one dimension corresponds to at least one of a shift in a horizontal dimension of one or more bits or a vertical direction of the one or more bits.

At 720, the method 700*a* can provide the plurality of instances of frame data to corresponding ones of the plurality processors. In an aspect, the method can include determining a first instance of the plurality of instances of the frame data, the first instance of the frame data structured in the plurality of dimensions. In an aspect, the method can include providing the first instance to a first processor among the plurality of processors, the first processor configured to execute input arranged in the plurality of dimensions. In an aspect, the system can provide the first instance to a first processor among the plurality of processors, the first processor configured to execute input arranged in the plurality of dimensions. In an aspect, the system can provide the second instance to a second processor among the plurality of processors, the second processor configured to execute input arranged in the plurality of dimensions. At 722, the method 700*a* can provide the plurality of instances to plurality of processors each configured to execute input arranged in the plurality of dimensions.

At 730, the method 700*a* can determine the plurality of instances of frame data each individually modified according to at least one dimension of the plurality of dimensions. The plurality of instances of frame data each provided to respective processors of the plurality of processors that are each configured to execute input arranged in the plurality of dimensions.

At 740, the method 700*a* can generate, based at least in part on the plurality of instances of the frame data, a plurality of features each respectively corresponding to an instance of frame data from the plurality of instances of the frame data. In an aspect, the method 700*a* can include determining a first feature of the plurality of features, the first feature structured in at least one of the plurality of dimensions. The method can include modifying, based at least in part on a first instance of the plurality of instances of the frame data, the first feature according to at least one dimension of the plurality of dimensions. In an aspect, the system can determine a first feature of the plurality of features, the first feature structured in at least one of the plurality of dimensions. The system can modify, based at least in part on a first instance of the plurality of instances of the frame data, the first feature according to at least one dimension of the plurality of dimensions. In an aspect, the method can include providing the first feature to a first processor among the plurality of processors. The method can include providing the second feature to a second processor among the plurality processors. In an aspect, the system can provide the first feature to a first processor among the plurality processors. In an aspect, the method can include providing the second instance to a second processor among the plurality processors, the second processor configured to execute input arranged in the plurality of dimensions. The system can provide the second feature to a second processor among the plurality processors. For example, a feature can correspond to a property of an image identified according to feature processing as discussed herein (e.g., Harris corner, NMS), but is not limited thereto. At 742, the method 700*a* can generate the plurality of features based at least in part on the plurality of instances of the frame data.

Figure 7B:
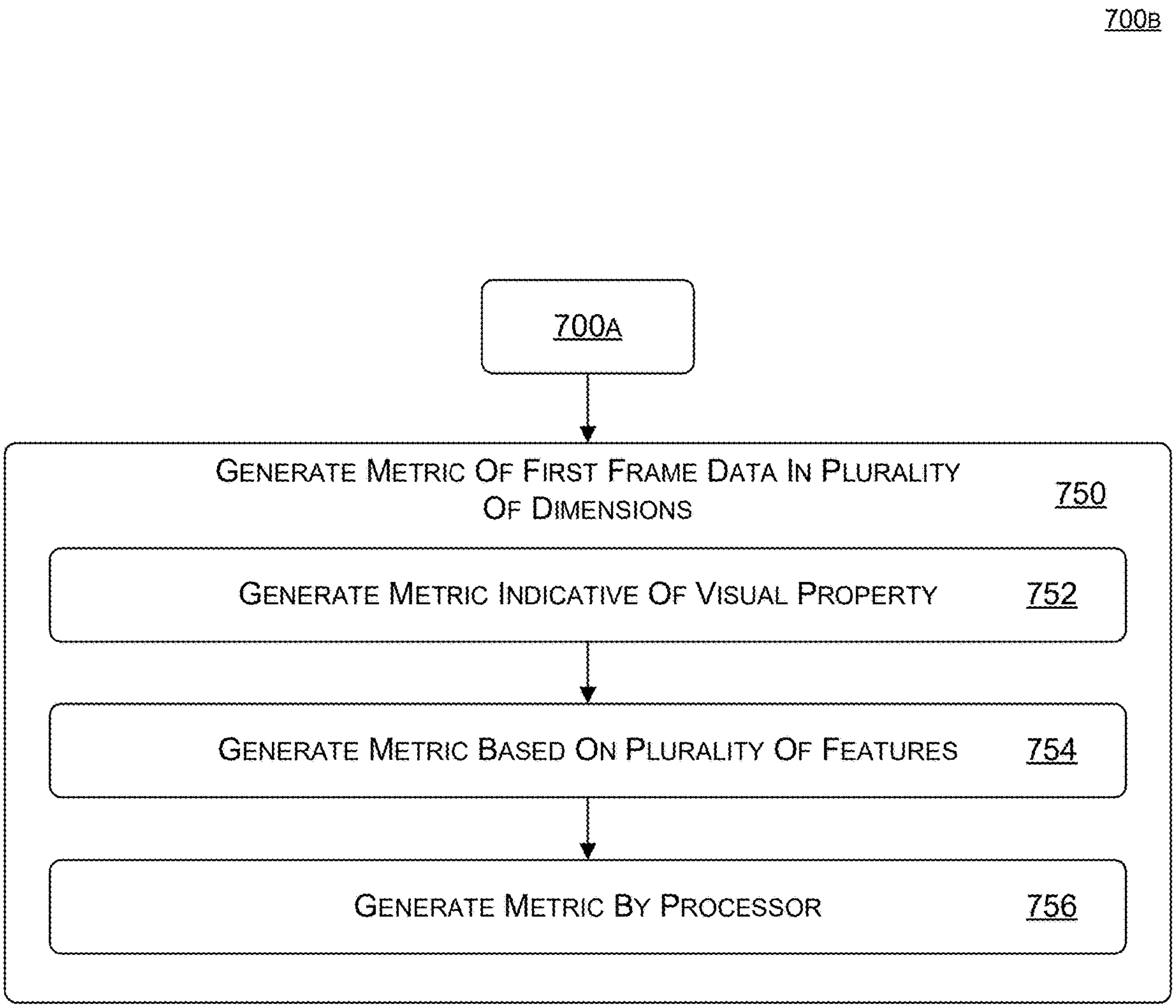
FIG. 7B depicts an example method of architecture and instruction set for multi-dimensional data processing, in accordance with some embodiments of the present disclosure.

FIG. 7B depicts an example method of architecture and instruction set for multi-dimensional data processing, according to this disclosure. At least the environment 100, the memory architecture 200, or any component thereof, can perform method 700*b*.

At 750, the method 700*b* can generate a metric of the first frame data in the plurality of dimensions. At 752, the method 700*b* can generate the metric indicative of a visual property. For example, a visual property can correspond to an aspect of image data that corresponds to a physical feature. For example, a visual property can correspond to a boundary between shapes, objects, areas of differing color, areas of differing luminosity, or any combination thereof, but is not limited thereto. At 754, the method 700*b* can generate the metric based on the plurality of features. At 756, the method 700*b* can generate the metric. In an aspect, the method 700*b* can include providing in response to the metric satisfying a condition indicative of presence of a feature in the frame data, the metric as output. In an aspect, the system can provide, in response to the metric satisfying a condition indicative of presence of a feature in the frame data, the metric as output. For example, the metric can correspond to IN as discussed herein, but is not limited thereto. In an aspect, the method can include providing in response to the metric not satisfying a condition indicative of presence of a feature in the frame data, output distinct from the metric. In an aspect, the system can provide, in response to the metric not satisfying a condition indicative of presence of a feature in the frame data, output distinct from the metric. For example, the output distinct from the metric can corresponds to S0 or a null output as discussed herein, but is not limited thereto. In an aspect, the condition corresponds to a local maximum, as discussed herein, associated with the visual property, and the feature is indicative of the visual property.

In an aspect, the system can include or correspond to an SoC. The SoC can include the at least one GPU and a plurality of processors. The SoC (e.g., the plurality of processors) can determine a first instance of the plurality of instances of the frame data, the first instance of the frame data structured in the plurality of dimensions. The SoC can modify, based on a second instance of the plurality of instances of the frame data, the first instance according to at least one dimension of the plurality of dimensions. The SoC can provide the first instance to a first processor among the one or more processors, the first processor configured to execute input arranged in the plurality of dimensions. The SoC can provide the second instance to a second processor among the one or more processors, the second processor configured to execute input arranged in the plurality of dimensions. In an aspect, at least one dimension corresponds to at least one of a shift in a horizontal dimension of one or more bits or a vertical direction of the one or more bits. The SoC can determine a first feature of the plurality of features, the first feature structured in at least one of the plurality of dimensions. The SoC can modify, based on a first instance of the plurality of instances of the frame data, the first feature according to at least one dimension of the plurality of dimensions. The SoC can provide the first feature to a first processor among the one or more processors. The SoC can provide the second feature to a second processor among the one or more processors. In an aspect, the at least one dimension corresponds to at least one of a shift in a horizontal dimension of one or more bits or a vertical direction of the one or more bits. The SoC can include provide, in response to the metric satisfying a condition indicative of presence of a feature in the frame data, the metric as output. The SoC can provide, in response to the metric not satisfying a condition indicative of presence of a feature in the frame data, output distinct from the metric.

Figure 7C:
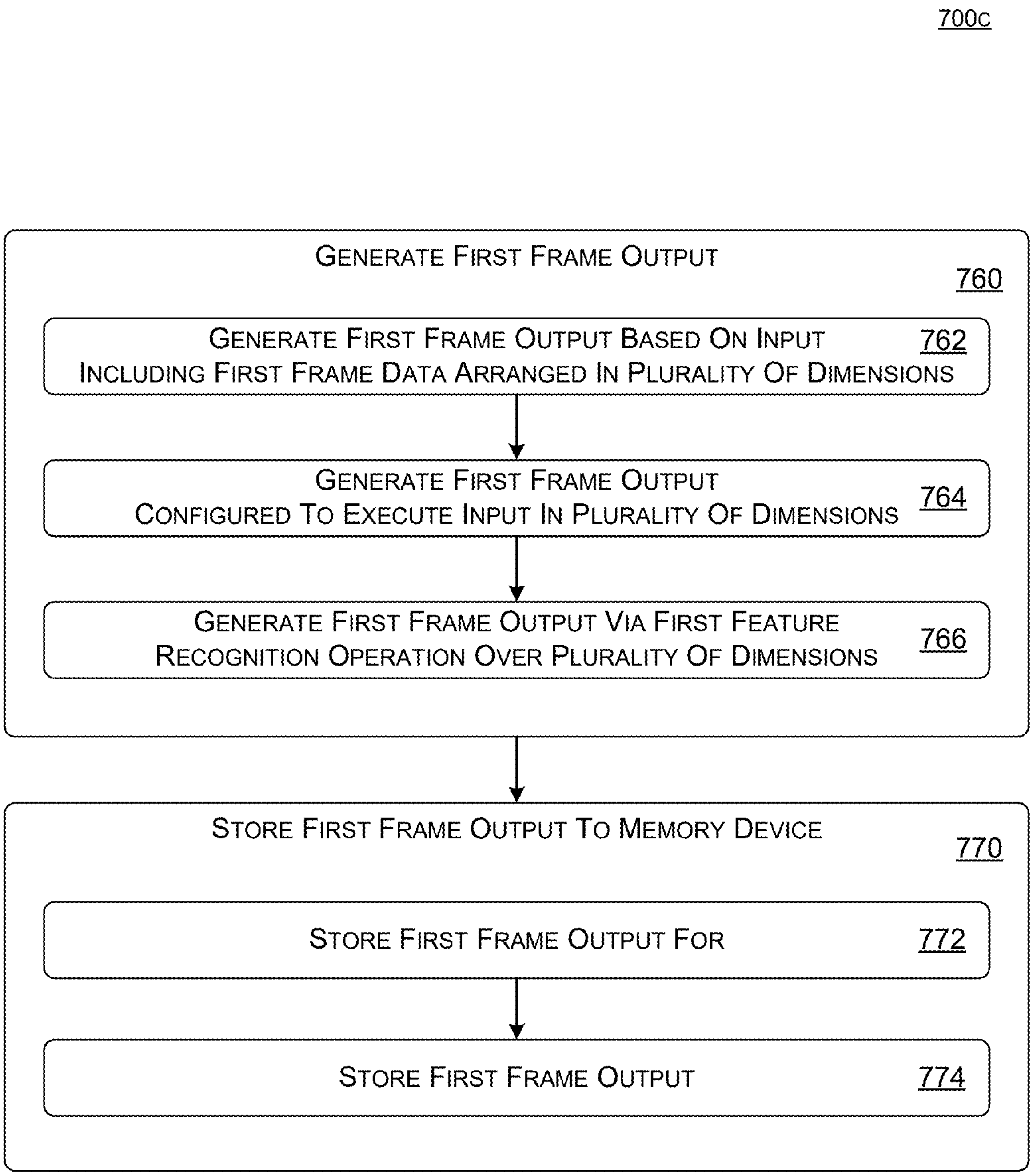
FIG. 7C depicts an example method of architecture and instruction set for multi-dimensional data processing, in accordance with some embodiments of the present disclosure.

FIG. 7C depicts an example method of architecture and instruction set for multi-dimensional data processing, according to this disclosure. At least the environment 100, the memory architecture 200, or any component thereof, can perform method 700*c*. The method 700*c* can be performed by a plurality of processors.

In an aspect, the method 700*c* can include configuring a plurality of processors to receive tile data in a format having a first block dimension in the plurality of dimensions that is greater than a second block dimension in the plurality of dimensions, the data can include the first frame data and the second frame data.

In an aspect, the system can configure the plurality of processors to receive tile data in a format having a first block dimension in the plurality of dimensions that is greater than a second block dimension in the plurality of dimensions, the data can include the first frame data and the second frame data.

In an aspect, the method can include determining the first block dimension as a portion of the first tile dimension. The method can include determining the second block dimension as a portion of the second tile dimension. In an aspect, the system can determine the first block dimension as a portion of the first tile dimension. The system can determine the second block dimension as a portion of the second tile dimension. In an aspect, the method can include where the first tile dimension is in a direction corresponding to the first block dimension, and the second tile dimension is in a direction corresponding to the second block dimension. In an aspect, the system can include where the first tile dimension is in a direction corresponding to the first block dimension, and the second tile dimension is in a direction corresponding to the second block dimension.

At 760, the method 700*c* can generate first frame output. At 762, the method 700*c* can generate the first frame output based on input including first frame data arranged in a plurality of dimensions. At 764, the method 700*c* can generate the first frame output configured to execute the input in the plurality of dimensions. At 766, the method 700*c* can generate the first frame output via a first feature recognition operation over the plurality of dimensions. At 770, the method 700*c* can store the first frame output to a memory device. At 772, the method 700*c* can store the first frame output for an edge of the first frame data along a dimension of the plurality of dimensions. At 774, the method 700*c* can store the first frame output.

Figure 7D:
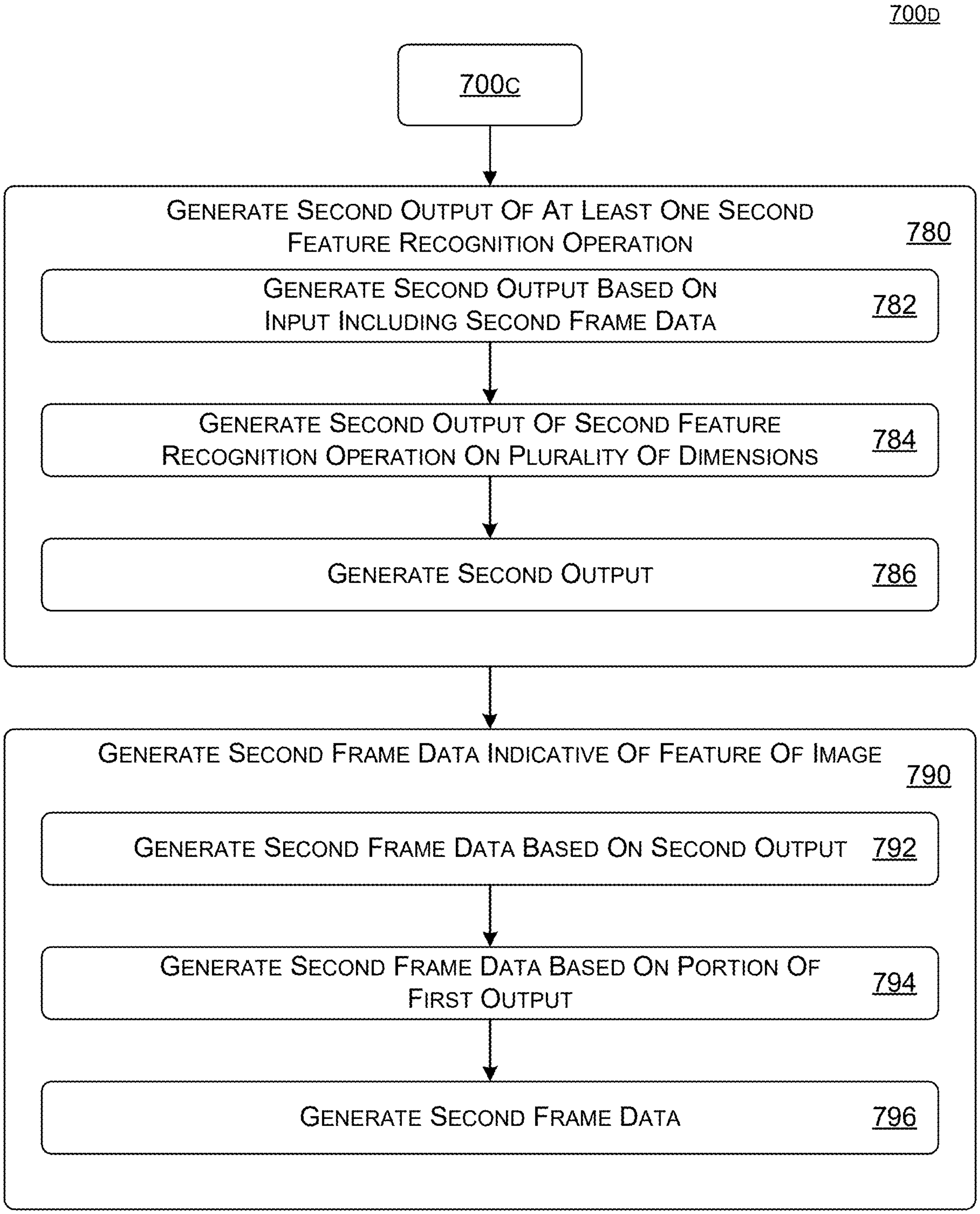
FIG. 7D depicts an example method of architecture and instruction set for multi-dimensional data processing, in accordance with some embodiments of the present disclosure.

FIG. 7D depicts an example method of architecture for and instruction set for multi-dimensional data processing, according to this disclosure. At least the environment 100, the memory architecture 200, or any component thereof, can perform method 700*d*. The method 700*d* can be performed by a plurality of processors. In an aspect, the method can include determining a tile size for the tile data, where the tile size corresponds to the first frame data and the second frame data, and the tile size has a first tile dimension greater than the first block dimension and a second tile dimension greater than the second block dimension. In an aspect, the system can determine a tile size for the tile data, where the tile size corresponds to the first frame data and the second frame data, and the tile size has a first tile dimension greater than the first block dimension and a second tile dimension greater than the second block dimension.

At 780, the method 700*d* can generate a second output of at least one second feature recognition operation. At 782, the method 700*d* can generate the second output based on input including second frame data. At 784, the method 700*d* can generate the second output of the second feature recognition operation on the plurality of dimensions. At 786, the method 700*d* can generate the second output.

At 790, the method 700*d* can generate second frame data indicative of a feature of an image. In an aspect, the method can include combining, along a second dimension of the plurality of dimensions different from the dimension, the second output and the portion of the first output into the second frame data. In an aspect, the system can combine, along a second dimension of the plurality of dimensions different from the dimension, the second output and the portion of the first output into the second frame data. In an aspect, the method can include dividing the tile data into the first frame data according to the first block dimension and the second block dimension. The method can include dividing the tile data into the second frame data according to the first block dimension and the second block dimension. In an aspect, the system can divide the tile data into the first frame data according to the first block dimension and the second block dimension. The system can divide the tile data into the second frame data according to the first block dimension and the second block dimension. At 792, the method 700*d* can generate the second frame data based on the second output. At 794, the method 700*d* can generate the second frame data based on the portion of the first output. At 796, the method 700*d* can generate the second frame data.

In an aspect, the first frame data corresponds to a first portion of image data, and the second frame data corresponds to a second portion of the image data that can include the edge of the first frame data. In an aspect, the first feature recognition operation executes a Harris corner operation over the plurality of dimensions. In an aspect, the second feature recognition operation executes a non-maximum suppression operation over the plurality of dimensions.

In an aspect, the SoC can include the at least one GPU and a plurality of processors. The SoC can include configure the plurality processors to receive tile data in a format having a first block dimension in the plurality of dimensions that is greater than a second block dimension in the plurality of dimensions, the data can include the first frame data and the second frame data. The SoC can include determine tile size for the tile data, where the tile size corresponds to the first frame data and the second frame data, and the tile size has a first tile dimension greater than the first block dimension and a second tile dimension greater than the second block dimension. The SoC can include determine the first block dimension as a portion of the first tile dimension. The SoC can include determine the second block dimension as a portion of the second tile dimension. In an aspect, the first tile dimension is in a direction corresponding to the first block dimension, and the second tile dimension is in a direction corresponding to the second block dimension. The SoC can include combine, along a second dimension of the plurality of dimensions different from the dimension, the second output and the portion of the first output into the second frame data. The SoC can include divide the tile data into the first frame data according to the first block dimension and the second block dimension. The SoC can include divide the tile data into the second frame data according to the first block dimension and the second block dimension. In an aspect, the first frame data corresponds to a first portion of image data, and the second frame data corresponds to a second portion of the image data that can include the edge of the first frame data. In an aspect, the first feature recognition operation executes a Harris corner operation over the plurality of dimensions. In an aspect, the second feature recognition operation executes a non-maximum suppression operation over the plurality of dimensions.

Figure 8:
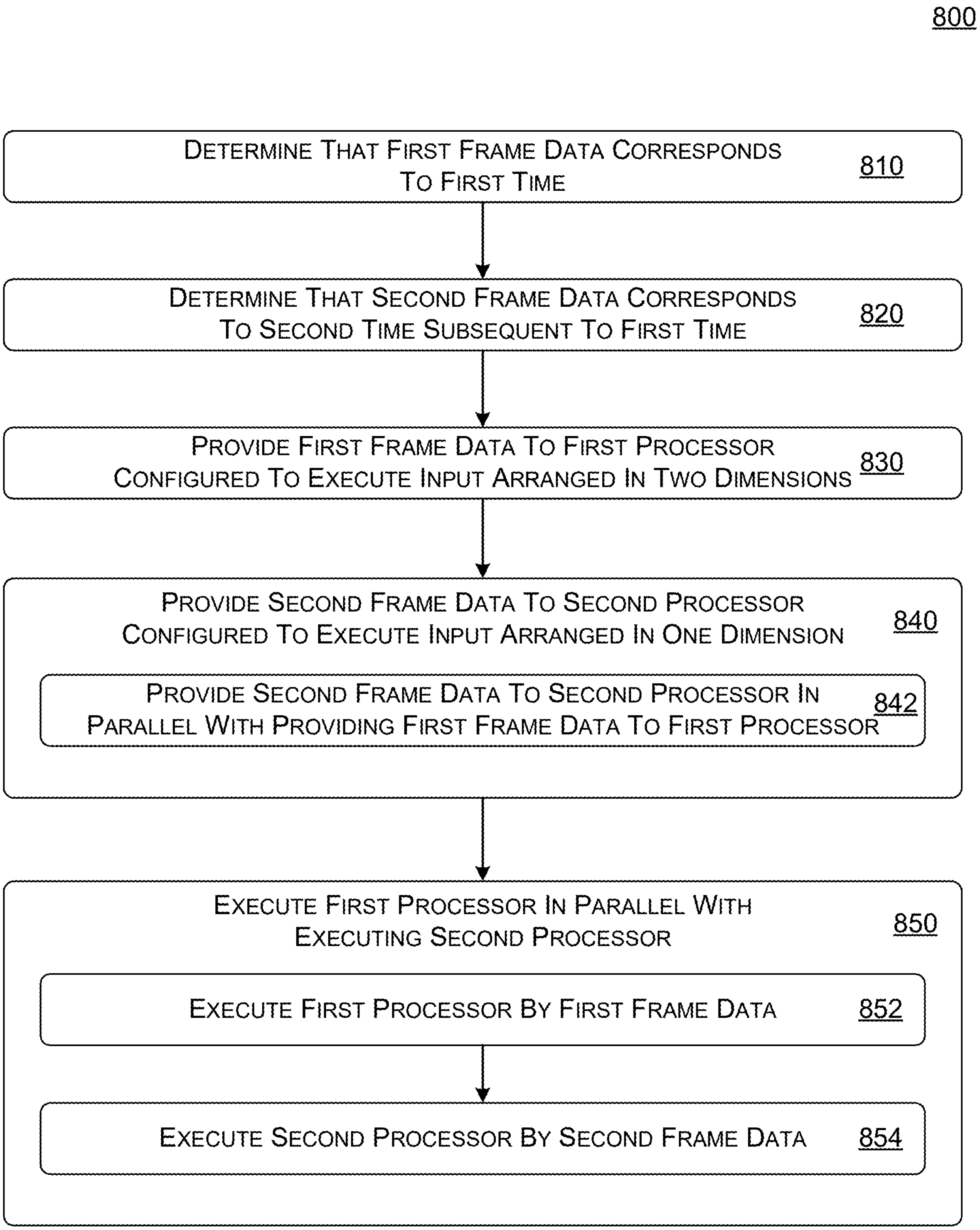
FIG. 8 depicts an example method of parallelized architecture for multi-dimensional data processing, in accordance with some embodiments of the present disclosure.

FIG. 8 depicts an example method of parallelized architecture for multi-dimensional data processing, according to this disclosure. At least the environment 100, the memory architecture 200, or any component thereof, can perform method 800. The method 800 can be performed by a plurality of processors. At 810, the method 800 can determine that first frame data corresponds to a first time. At 820, the method 800 can determine that second frame data corresponds to a second time subsequent to the first time. For example, a first time can correspond to a first timestamp, and a second time can correspond to a second timestamp. For example, a second time can be subsequent to a first time according to a determination that the second timestamp (e.g., UNIX timestamp) has a value or absolute value greater than a value or absolute value of the first timestamp (e.g., distinct UNIX timestamp), where UNIX timestamps are measured as seconds increasing from a given epoch.

At 830, the method 800 can provide the first frame data to a first processor of the plurality of processors configured to execute input arranged in two dimensions. In an aspect, the method can execute one or more first instructions based on the first frame data. In an aspect, the system can execute one or more first instructions based on the first frame data. In an aspect, the one or more first instructions correspond to at least one of a masking operation, a packing operation, or a halo preparation operation. In an aspect, the method can include providing, subsequent to the providing the first frame data to the first processor, third frame data to the first processor, the third frame data corresponding to output of the first processor based on the first frame data. The method can include executing, by the first processor subsequent to the providing the first frame data to the first processor, one or more instructions based on the first frame data. In an aspect, the system can provide, subsequent to the providing the first frame data to the first processor, third frame data to the first processor, the third frame data corresponding to output of the first processor based on the first frame data. The system can execute, by the first processor subsequent to the providing the first frame data to the first processor, one or more instructions based on the first frame data. In an aspect, the one or more instructions correspond to a non-maximum suppression operation.

At 840, the method 800 can provide the second frame data to a second processor of the plurality of processors configured to execute input arranged in one dimension. In an aspect, the method can execute, subsequent to the executing the one or more first instructions, one or more second instructions based on the first frame data. In an aspect, the system can execute, subsequent to the executing the one or more first instructions, one or more second instructions based on the first frame data. At 842, the method 800 can provide the second frame data to the second processor in parallel with the providing the first frame data to the first processor. In an aspect, the one or more second instructions correspond to a halo preparation operation.

At 850, the method 800 can execute the first processor in parallel with executing the second processor. At 852, the method 800 can execute the first processor according to the first frame data. At 854, the method 800 can execute the second processor according to the second frame data. In an aspect, the method can include providing, in parallel with the executing the one or more instructions based on the first frame data, the fourth frame data to the second processor, the fourth frame data corresponding to output of the second processor based on the second frame data. In an aspect, the system can provide, in parallel with the executing the one or more instructions based on the first frame data, the fourth frame data to the second processor, the fourth frame data corresponding to output of the second processor based on the second frame data. For example, the fourth frame data can be distinct from the first, second, and third frame data, and can correspond to a frame or portion of a frame of video data distinct from frames or portions of frames of video data corresponding to the first frame data, the second frame data, or the third frame data.

In an aspect, the method can include providing, subsequent to the providing the first frame data to the first processor, the first frame data to the second processor. The method can include executing, by the second processor subsequent to the providing the first frame data to the first processor, one or more instructions based on the first frame data. In an aspect, the system can provide, subsequent to the providing the first frame data to the first processor, the first frame data to the second processor. The system can execute, by the second processor subsequent to the providing the first frame data to the first processor, one or more instructions based on the first frame data. In an aspect, the one or more instructions correspond to an injection operation.

In an aspect, the system can include or correspond to an SoC. In an aspect, the SoC can include the at least one GPU and a plurality of processors. The SoC can include executing one or more first instructions based on the first frame data. In an aspect, the one or more first instructions correspond to at least one of a masking operation, a packing operation, or a halo preparation operation. The SoC can execute, by the first processor of the plurality of processors subsequent to the executing the one or more first instructions, one or more second instructions based on the first frame data. In an aspect, the one or more second instructions correspond to a halo preparation operation. The SoC can provide, subsequent to the providing the first frame data to the first processor, the first frame data to the second processor of the plurality of processors. The SoC can execute, by the second processor subsequent to the providing the first frame data to the first processor, one or more instructions based on the first frame data. In an aspect, the one or more instructions correspond to an injection operation. The SoC can provide, subsequent to the providing the first frame data to the first processor, third frame data to the first processor, the third frame data corresponding to output of the first processor based on the first frame data. The SoC can execute, by the first processor subsequent to the providing the first frame data to the first processor, one or more instructions based on the first frame data. In an aspect, the one or more instructions correspond to a non-maximum suppression operation. The SoC can provide, in parallel with the executing the one or more instructions based on the first frame data, the fourth frame data to the second processor, the fourth frame data corresponding to output of the second processor based on the second frame data.

In an aspect, the system can include the plurality of processors in a control system for an autonomous or semi-autonomous machine. The system can include a perception system for an autonomous or semi-autonomous machine. The system can include a system implemented using a robot. The system can include an aerial system. The system can include a medical system. The system can include a boating system. The system can include a smart area monitoring system. The system can include a system for performing deep learning operations. The system can a system for performing simulation operations. The system can include a system for generating or presenting virtual reality (VR) content, augmented reality (AR) content, or mixed reality (MR) content. The system can include a system for performing digital twin operations. The system can include a system implemented using an edge device. The system can include a system incorporating one or more virtual machines (VMs). The system can include a system for generating synthetic data. The system can be implemented at least partially in a data center. The system can a system for performing conversational artificial intelligence (AI) operations. The system can include a system for performing generative AI operations. The system can include a system implementing language models. The system can include a system implementing vision language models (VLMs). The system can include a system implementing large language models (LLMs). The system can include a system implementing multi-modal language models. The system can include a system for hosting one or more real-time streaming applications. The system can include a system for performing light transport simulation. The system can include a system for performing collaborative content creation for 3D assets. In an aspect, the system can be implemented at least partially using cloud computing resources.

Example Autonomous Vehicle

Figure 9A:
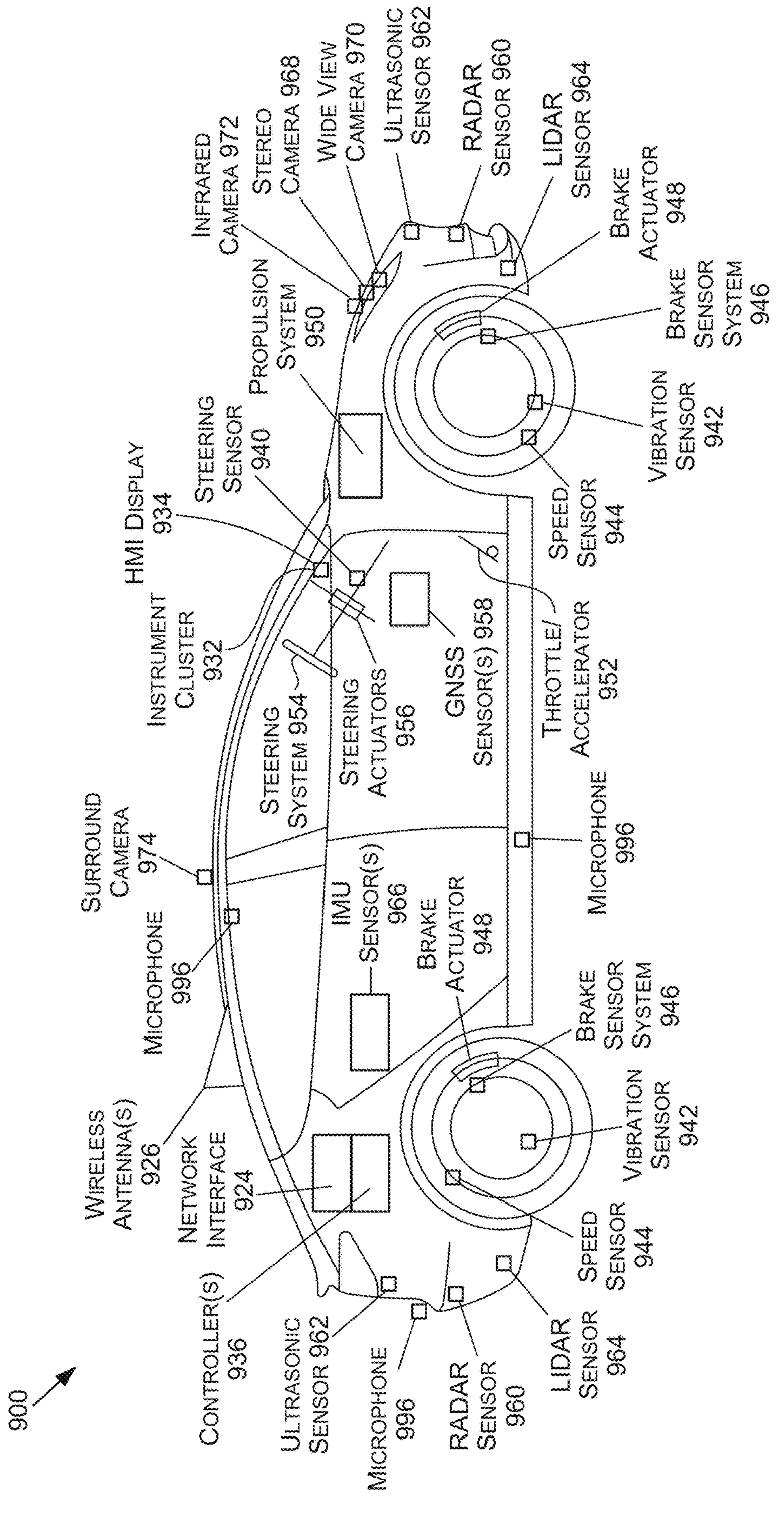
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
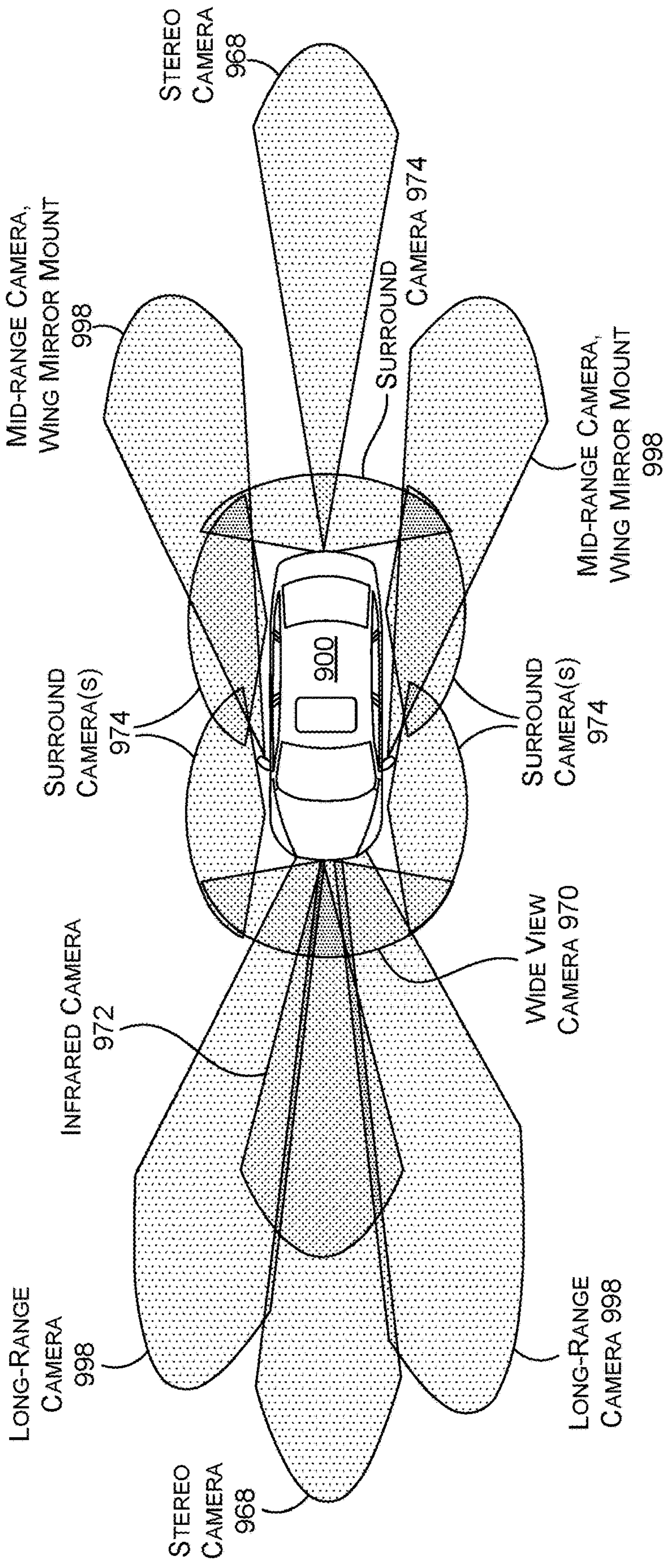
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
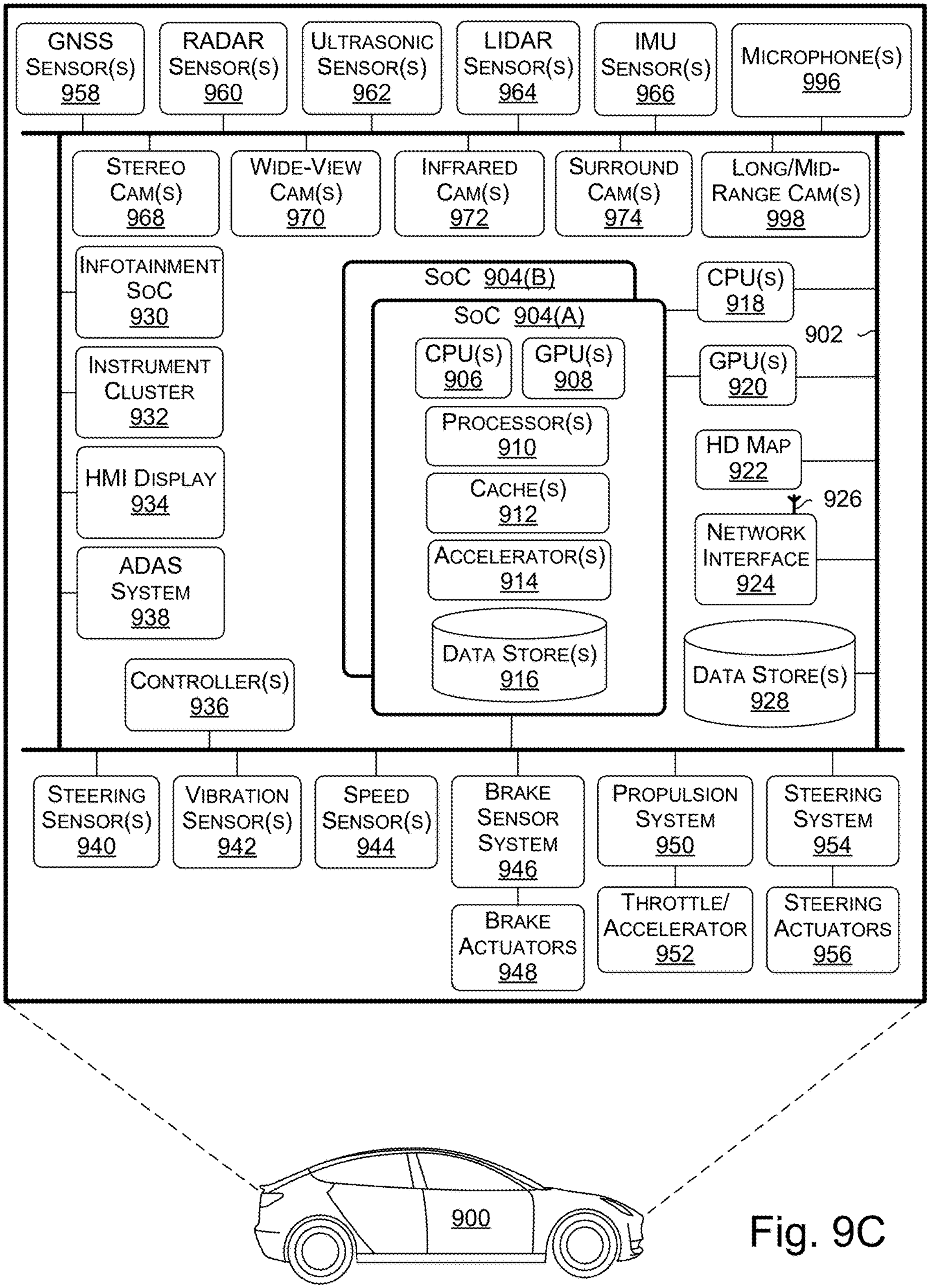
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear).

Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS. CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 900), while the 12V communication concept provides information about traffic further ahead. CACC systems may include either or both 12V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
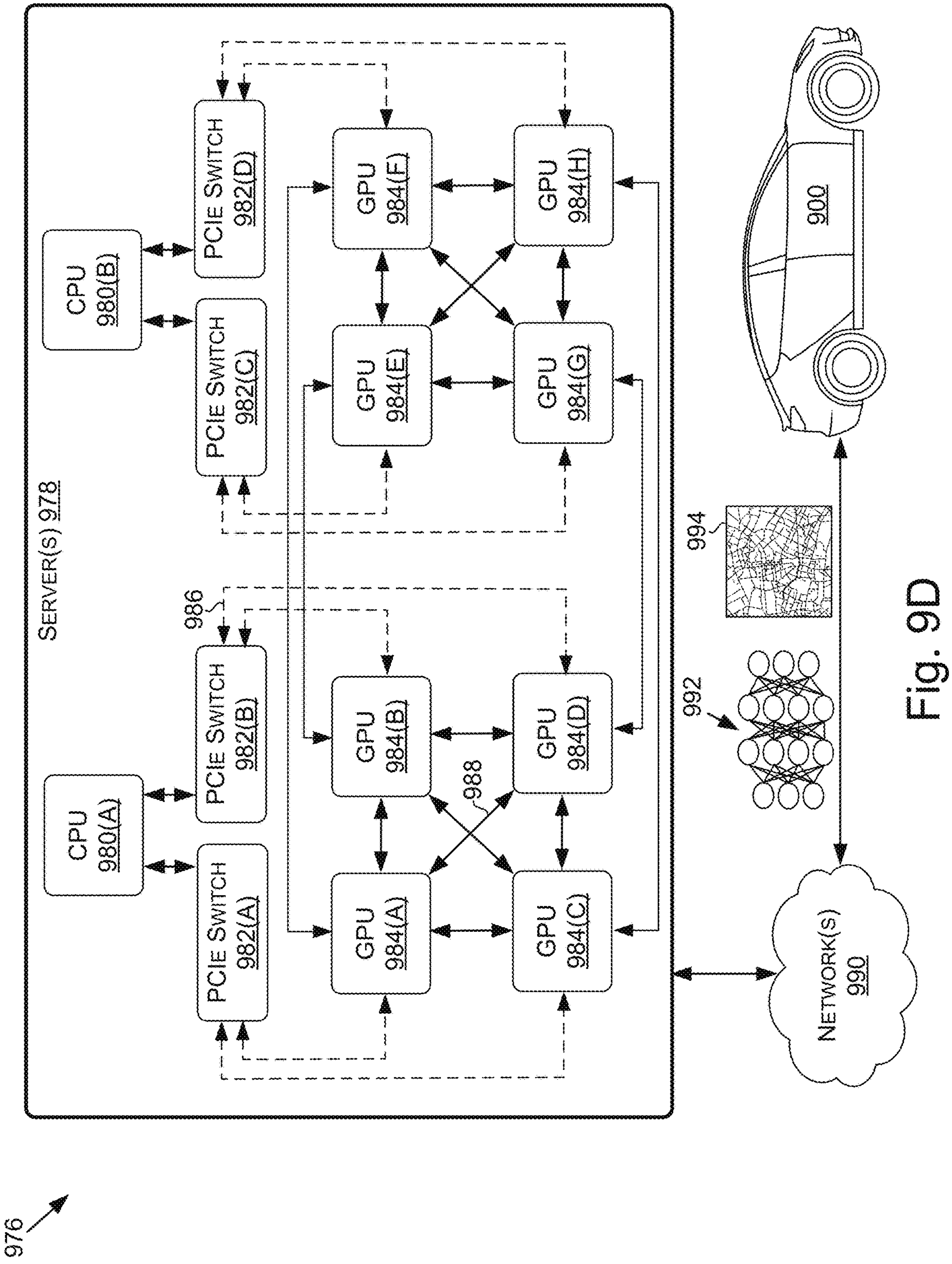
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other preprocessing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
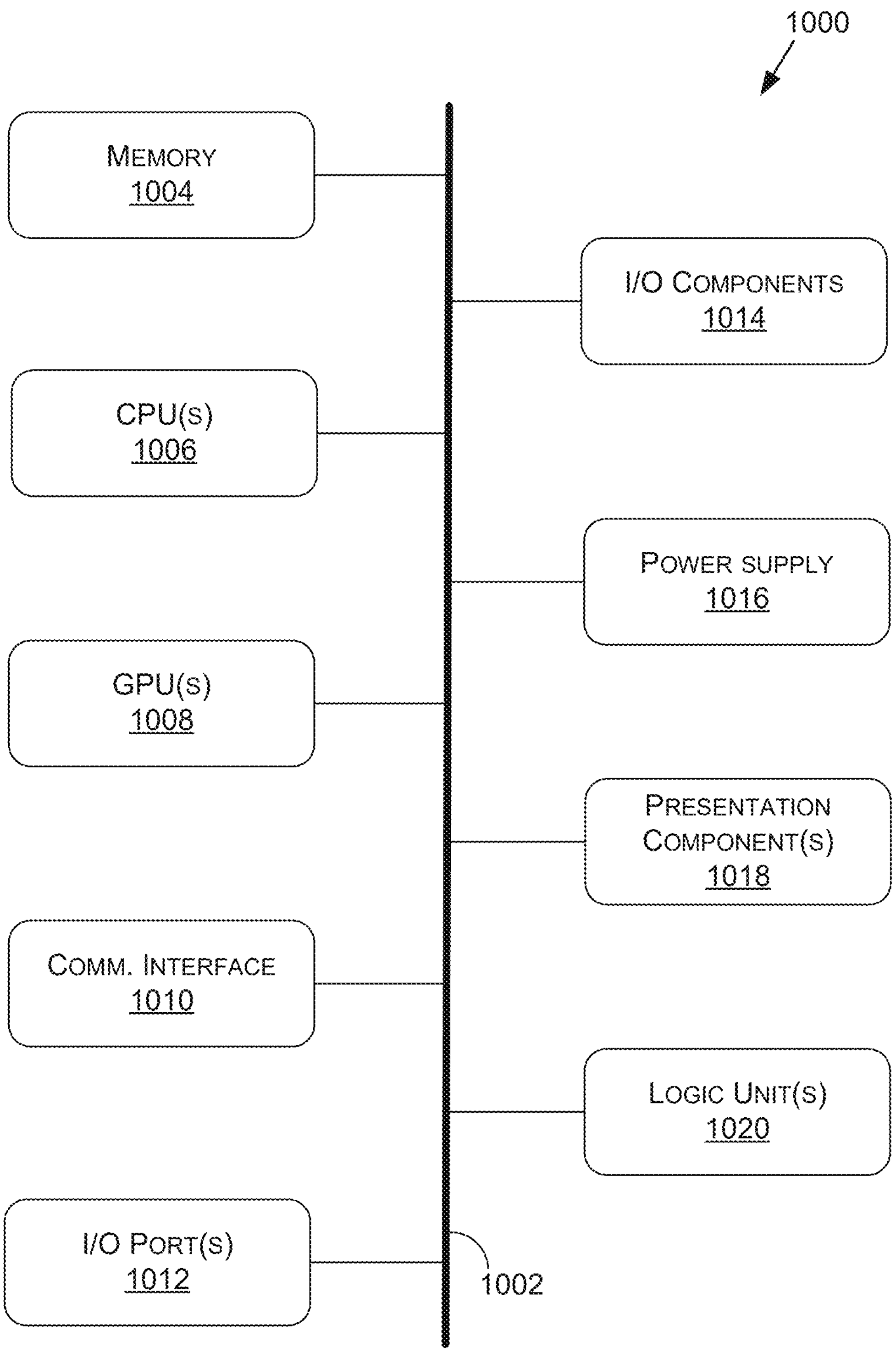
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per sc.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
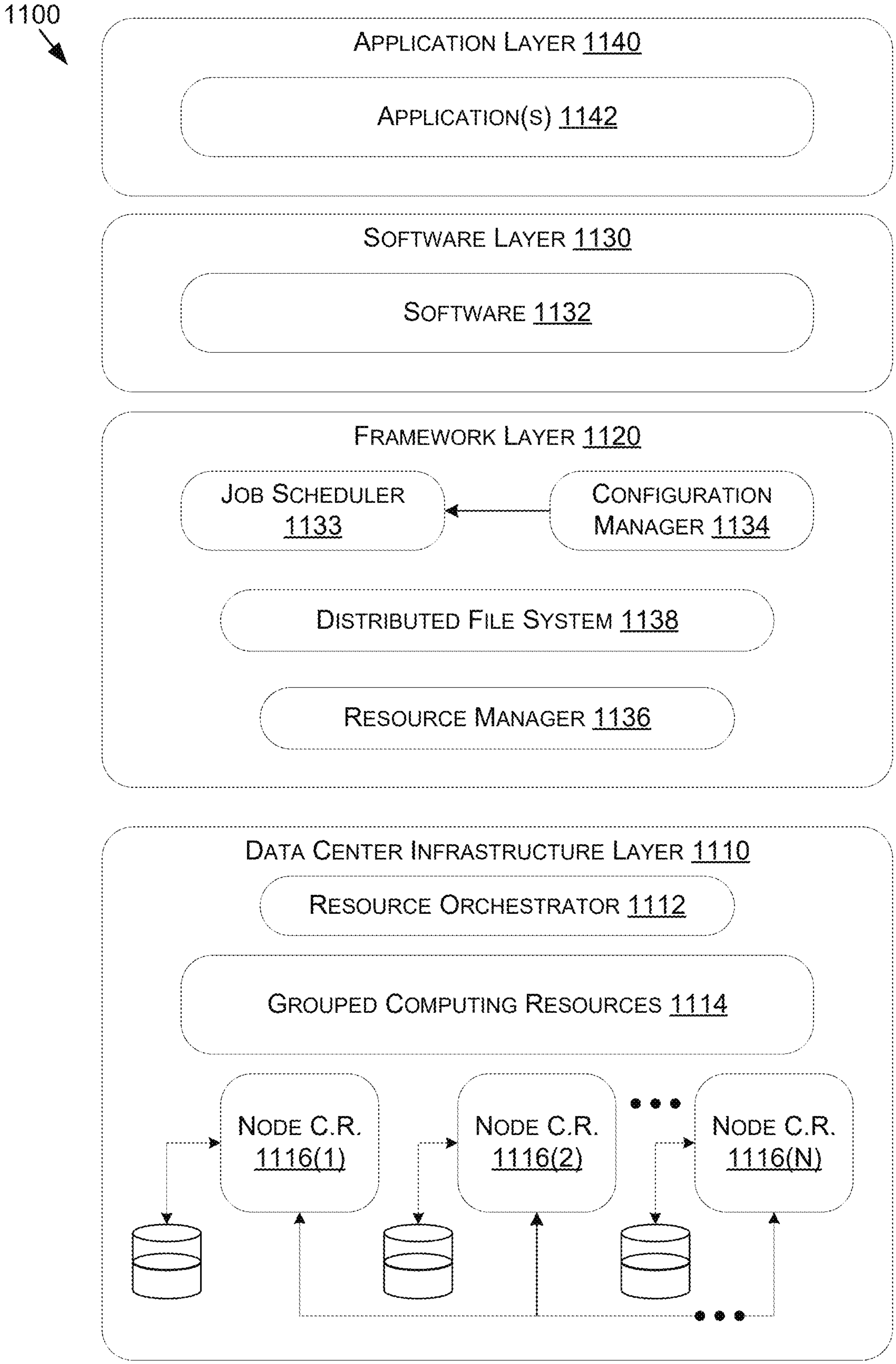
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

What is claimed is:

1. A system, comprising:
a plurality of processors to:
determine that first frame data corresponds to a first time and that second frame data corresponds to a second time subsequent to the first time;
provide the first frame data to a first processor of the plurality of processors configured to execute input arranged in two dimensions;
provide, in parallel with the providing the first frame data to the first processor, the second frame data to a second processor of the plurality of processors configured to execute input arranged in one dimension; and
execute the first processor according to the first frame data in parallel with executing the second processor according to the second frame data.

2. The system of claim 1, wherein the plurality of processors to:
execute one or more first instructions based on the first frame data.

3. The system of claim 2, wherein the one or more first instructions correspond to at least one of a masking operation, a packing operation, or a halo preparation operation.

4. The system of claim 2, wherein the plurality of processors to:
execute, subsequent to the executing the one or more first instructions, one or more second instructions based on the first frame data.

5. The system of claim 4, wherein the one or more second instructions correspond to a halo preparation operation.

6. The system of claim 1, wherein the plurality of processors to:
provide, subsequent to the providing the first frame data to the first processor, the first frame data to the second processor; and
execute, by the second processor subsequent to the providing the first frame data to the first processor, one or more instructions based on the first frame data.

7. The system of claim 6, wherein the one or more instructions correspond to an injection operation.

8. The system of claim 1, wherein the plurality of processors to:
provide, subsequent to the providing the first frame data to the first processor, third frame data to the first processor, the third frame data corresponding to output of the first processor based on the first frame data; and
execute, by the first processor subsequent to the providing the first frame data to the first processor, one or more instructions based on the first frame data.

9. The system of claim 8, wherein the one or more instructions correspond to a non-maximum suppression operation.

10. The system of claim 8, wherein the plurality of processors to:
provide, in parallel with the executing the one or more instructions based on the first frame data, the fourth frame data to the second processor, the fourth frame data corresponding to output of the second processor based on the second frame data.

11. The system of claim 1, wherein plurality of processors are comprised in at least one of:
a control system for an autonomous or semi-autonomous machine;
a perception system for an autonomous or semi-autonomous machine;
a system implemented using a robot;
an aerial system;
a medical system;
a boating system;
a smart area monitoring system;
a system for performing deep learning operations;
a system for performing simulation operations;
a system for generating or presenting virtual reality (VR) content, augmented reality (AR) content, or mixed reality (MR) content;
a system for performing digital twin operations;
a system implemented using an edge device;
a system incorporating one or more virtual machines (VMs);
a system for generating synthetic data;
a system implemented at least partially in a data center;
a system for performing conversational artificial intelligence (AI) operations;
a system for performing generative AI operations;
a system implementing language models;
a system implementing vision language models (VLMs);
a system implementing large language models (LLMs);
a system implementing multi-modal language models;
a system for hosting one or more real-time streaming applications;
a system for performing light transport simulation;
a system for performing collaborative content creation for 3D assets; or
a system implemented at least partially using cloud computing resources.

12. A system-on-chip (SoC), comprising:
at least one graphics processing unit (GPU); and
a plurality of processors to:
determine that first frame data corresponds to a first time and that second frame data corresponds to a second time subsequent to the first time;
provide the first frame data to a first processor of the plurality of processors configured to execute input arranged in two dimensions;
provide, in parallel with the providing the first frame data to the first processor, the second frame data to a second processor of the plurality of processors configured to execute input arranged in one dimension; and
execute the first processor according to the first frame data in parallel with executing the second processor according to the second frame data.

13. The SoC of claim 12, wherein the plurality of processors to:
execute one or more first instructions based on the first frame data.

14. The SoC of claim 13, wherein the one or more first instructions correspond to at least one of a masking operation, a packing operation, or a halo preparation operation.

15. The SoC of claim 13, wherein the plurality of processors to:
execute, by the first processor subsequent to the executing the one or more first instructions, one or more second instructions based on the first frame data.

16. The SoC of claim 15, wherein the one or more second instructions correspond to a halo preparation operation, an injection operation, or a non-maximum suppression operation.

17. The SoC of claim 12, wherein the plurality of processors to:

provide, subsequent to the providing the first frame data to the first processor, the first frame data to the second processor; and execute, by the second processor subsequent to the providing the first frame data to the first processor, one or more instructions based on the first frame data.

18. The SoC of claim 12, comprising the at least one GPU to:

provide, subsequent to the providing the first frame data to the first processor, third frame data to the first processor, the third frame data corresponding to output of the first processor based on the first frame data; and execute, by the first processor subsequent to the providing the first frame data to the first processor, one or more instructions based on the first frame data.

19. The SoC of claim 12, wherein the plurality of processors to:

provide, in parallel with the executing the one or more instructions based on the first frame data, the fourth frame data to the second processor, the fourth frame data corresponding to output of the second processor based on the second frame data.

20. A method performed by a plurality of processors, comprising:

determining that first frame data corresponds to a first time and that second frame data corresponds to a second time subsequent to the first time;

providing the first frame data to a first processor of the plurality of processors configured to execute input arranged in two dimensions;

providing, in parallel with the providing the first frame data to the first processor, the second frame data to a second processor of the plurality of processors configured to execute input arranged in one dimension; and executing the first processor according to the first frame data in parallel with executing the second processor according to the second frame data.

* * * * *